United States Patent [19]
Kanzaki et al.

[11] Patent Number: 5,562,454
[45] Date of Patent: Oct. 8, 1996

[54] EDUCATIONAL MECHATRONICS APPARATUS

[75] Inventors: Kazuo Kanzaki; Haruhisa Kawasaki; Takeshi Sato, all of Kanazawa, Japan

[73] Assignee: Kanazawa Institute of Technology, Ishikawa, Japan

[21] Appl. No.: 300,801

[22] Filed: Sep. 2, 1994

[30] Foreign Application Priority Data

Sep. 6, 1993 [JP] Japan .................. 5-048427 U

[51] Int. Cl.$^6$ .................................................. G09B 19/00
[52] U.S. Cl. .................... 434/219; 434/118; 434/224
[58] Field of Search .................. 434/112, 169, 434/201, 224, 307 R, 365, 118, 379, 380, 401, 219; 178/18–20

[56] References Cited

U.S. PATENT DOCUMENTS

| | | | |
|---|---|---|---|
| 3,281,970 | 11/1966 | Sandor | 434/224 |
| 3,540,135 | 11/1970 | Alcosser et al. | 434/118 |
| 3,667,104 | 6/1972 | Chaimillard et al. | 434/224 X |
| 4,315,320 | 2/1982 | Gabriel | 434/118 X |
| 4,650,425 | 3/1987 | McGarry | 434/219 |
| 4,776,798 | 10/1988 | Crawford | 434/224 |
| 4,812,125 | 3/1989 | Strashun | 434/219 X |
| 4,943,238 | 7/1990 | Gregorio | 434/219 X |
| 5,009,067 | 4/1991 | Bonnell | 434/224 X |
| 5,423,684 | 6/1995 | Ishikawa | 434/224 |

FOREIGN PATENT DOCUMENTS 644706   8/1984   Switzerland ............ 434/224

*Primary Examiner*—Joe Cheng
*Attorney, Agent, or Firm*—Locke Reynolds

[57] ABSTRACT

An educational mechatronics apparatus comprises a plurality of circuit boards respectively corresponding to blocks appearing on a block diagram of an automatic control system, the circuit boards being arranged along the direction of signal transfer, each of the circuit boards being provided with circuit components including input and output terminals and having a center area and opposite end portions, and a transparent protective plate covering the center area of the circuit board to inhibit a learner to touch the circuit components other than the input and output terminals located in the end portions of the circuit board. The input and output terminals located in the center portion of the circuit board are wired in advance of assembly of the apparatus, and the input and output terminals located in the end portions are adapted to be wired for learning by leads.

18 Claims, 22 Drawing Sheets

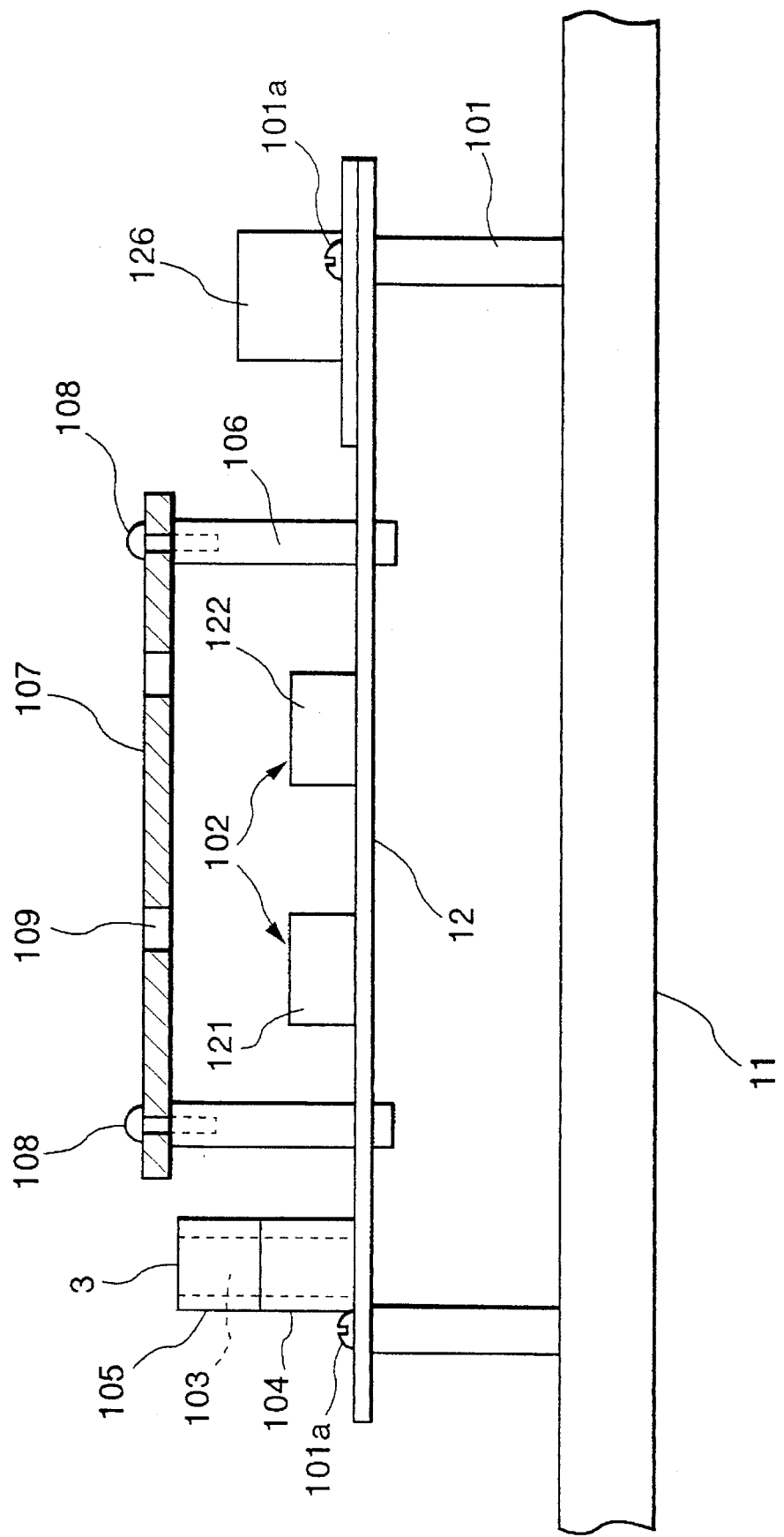

U1 : 74HC14
U2 : 74HC74 1/2
U3 : 74HC74 1/2

5,562,454

EDUCATIONAL MECHATRONICS APPARATUS

BACKGROUND OF THE INVENTION

1. Field of the Invention

The present invention relates to an educational mechatronics apparatus for use in teaching mechatronics in school.

2. Description of the Related Art

Mechatronics is composite technology including mechanical technology, electric technology, electronic technology and computer technology. It is desirable to learn mechatronics effectively through empirical studies.

Conventional educational mechatronics apparatus for use in teaching mechatronics are provided with a driving control circuit of a compact size, and the driving control circuit controls the operation of mechanisms according to information given thereto from a computer. In most educational mechatronics apparatus, the configuration of their automatic controller is displayed in a block diagram on a panel, and the operations of their mechanical devices are controlled by operating dials of variable resistors and such.

When the educational mechatronics apparatus is provided with a driving control circuit having a compact size, it is difficult for an inexperienced learner to understand the functions of the mechatronics apparatus. When the configuration of the automatic controller is shown by a block diagram on a panel and the mechanical devices are operated by operating the dials of the variable resistors and such, it is impossible to understand the process of driving the mechanical devices by observation and touching, and to understand the process concretely.

Accordingly, the educational effect of the conventional educational mechatronics apparatus is scarcely different from that of instruction only by lectures not using any educational apparatus.

SUMMARY OF THE INVENTION

Accordingly, it is an object of the present invention to solve the foregoing problems and to provide an educational mechatronics apparatus having control circuits capable of being optionally combined, enabling the visual recognition of the constitution of the control circuits, and facilitating the understanding of the operations of the control circuits.

Another object of the present invention is to provide an educational mechatronics apparatus capable of securing safety for the operator.

According to the present invention, an educational mechatronics apparatus comprises circuit boards respectively corresponding to blocks appearing on a block diagram of an automatic control system, the circuit boards being arranged along the direction of signal transfer. Each of the circuit boards is provided with circuits components including input and output terminals, and has a center area and opposite end portions. A transparent protective plate covers the center area of the circuit board to inhibit the learner to touch circuit components other than the input and output terminals located in the end potions of the circuit board. The input and output terminals in the center area are wired in advance of assembly of the apparatus, and the input and output terminals in the end portions are adapted to be wired for learning by leads.

In one embodiment of the invention, the apparatus is divided into a driving unit, a feedback control unit and a kinetic unit. The driving unit and the feedback control unit comprise respective base boards and the circuit boards mounted on the base boards along the direction of signal transfer. The apparatus further comprises a computer and a power source.

Preferably, the circuit board includes printed wires formed on the back surface thereof, and the circuit board is supported on a post attached to the base board to visually distinguish the circuit boards from each other.

The driving unit may include a plurality of circuit boards respectively provided with a displacement subtracter and a gain adjuster, a speed subtracter and an integrator/adder, a current detector, a current subtracter and a gain adjuster, a voltage amplifier, an integrator and a gain adjuster, and a power amplifier. On the other hand, the feedback control unit may include a plurality of circuit boards respectively provided with a lowpass filter, a gain adjuster, a direction discriminator, a counter, and a D/A converter and a level adjuster.

Preferably, the kinetic unit comprises a motion mechanism, a DC servomotor for driving the motion mechanism through a reduction gear or a speed increasing gear, a speed sensor, a displacement sensor, and a base board supporting these components. The motion mechanism may be selected from a group consisting of a belt-and-pulley mechanism, a slider crank chain mechanism, a four-bar linkage mechanism and a ball-screw feed mechanism. Hazardous moving parts of the motion mechanism may be covered with a transparent box.

More preferably, the output of the DC servomotor is transmitted to the motion mechanism through reduction gears which reduce a speed to about half a rotational speed of the motor or below, and an inertial disk is mounted on the motor to generate vibrations.

The apparatus, other than the computer and the power source, are divided into the readily distinguishable three units mounted on the base boards, and the correspondence of the internal constitution of the driving unit and the feedback control unit to the blocks of the block diagram of the automatic control system employed in lectures can visually be recognized by the circuit boards supported on the base boards in an arrangement along the direction of signal transfer. The circuit boards are assembled actually and are different from those of the conventional educational mechatronics apparatus which can be neither observed nor touched. Therefore, even the internal constitution of each block is visually recognizable.

The transparent protective plates protects those parts that should not be allowed to be operated by the learner, while maintaining the effect allowing the learner to observe the internal constitution of the block visually. Since only the input and output terminals relating to a connecting system for interconnecting the desired blocks are allowed to be operated by the learner, the learner is able to complete a desired connection without confusion by using only the least necessary number of connecting cords provided with, for example, banana plugs.

In case the printed wires are arranged on the back surfaces of the circuit boards, the configuration of the circuits formed on the circuit boards can readily be understood. By spacing the circuit boards apart from the corresponding base boards, the learner is able to distinguish the circuit boards visually from each other.

As mentioned above, the motion mechanism of the kinetic unit may operate at a speed half a rotational speed of the DC servomotor or below for enhanced safety. When the motion mechanism operates at such a comparatively low speed, a vibratory phenomenon that occurs at a high speed does not occur and hence the study of vibration control is impossible. It will thus be necessary to mount the inertial disk on the motor, which drives the motion mechanism, in order to generate vibrations so that the study of speed feedback control for suppressing vibrations becomes possible, while avoiding danger that would be entailed by high-speed operation.

BRIEF DESCRIPTION OF THE DRAWINGS

FIG. 7 is a sectional view of a circuit board provided with electronic circuits and a transparent protective plate;

DESCRIPTION OF THE PREFERRED EMBODIMENTS

Figure 1:
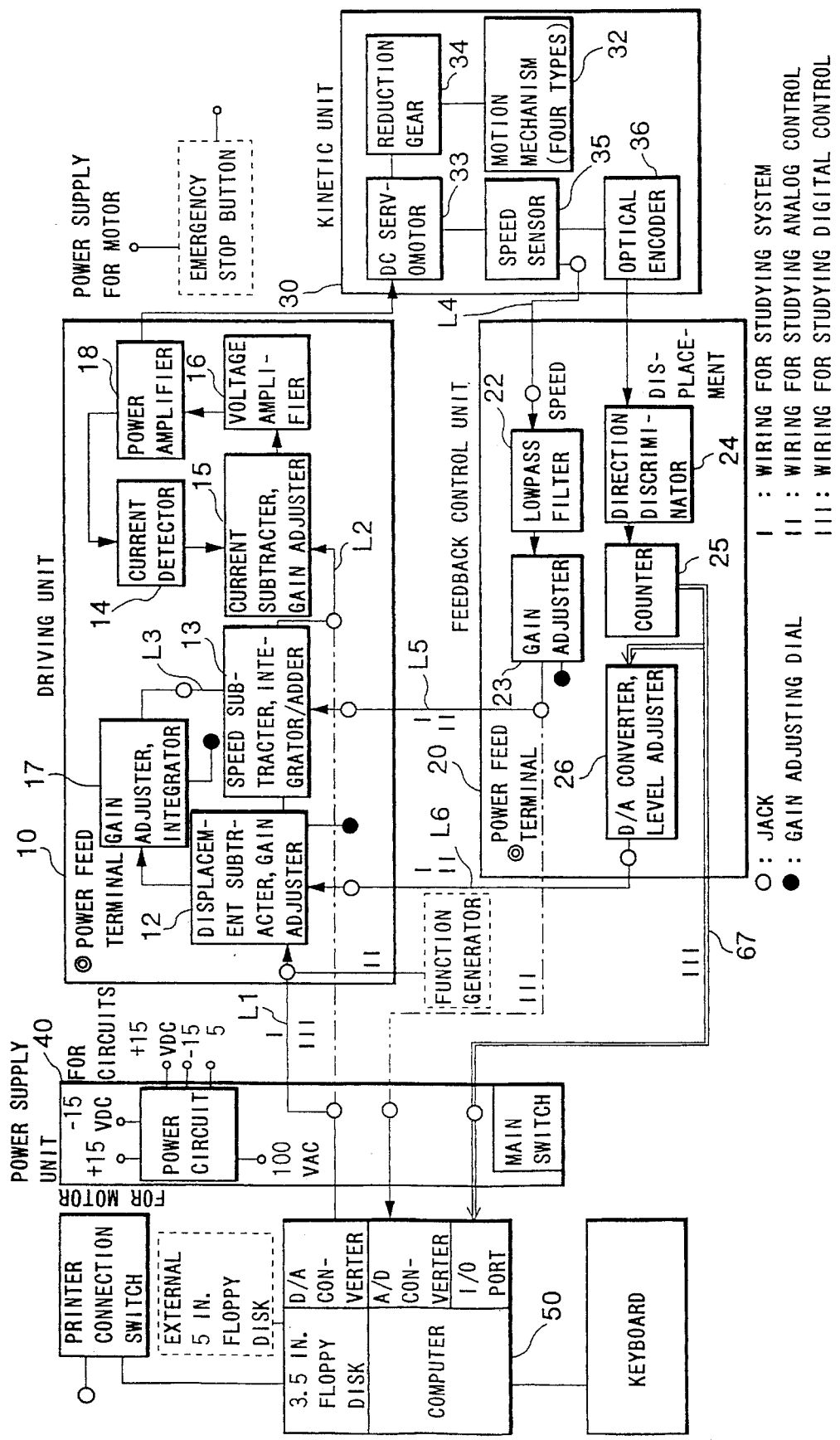
FIG. 1 is a block diagram of an educational mechatronics apparatus in a preferred embodiment according to the present invention, showing examples of wiring for experiments.
Figure 2:
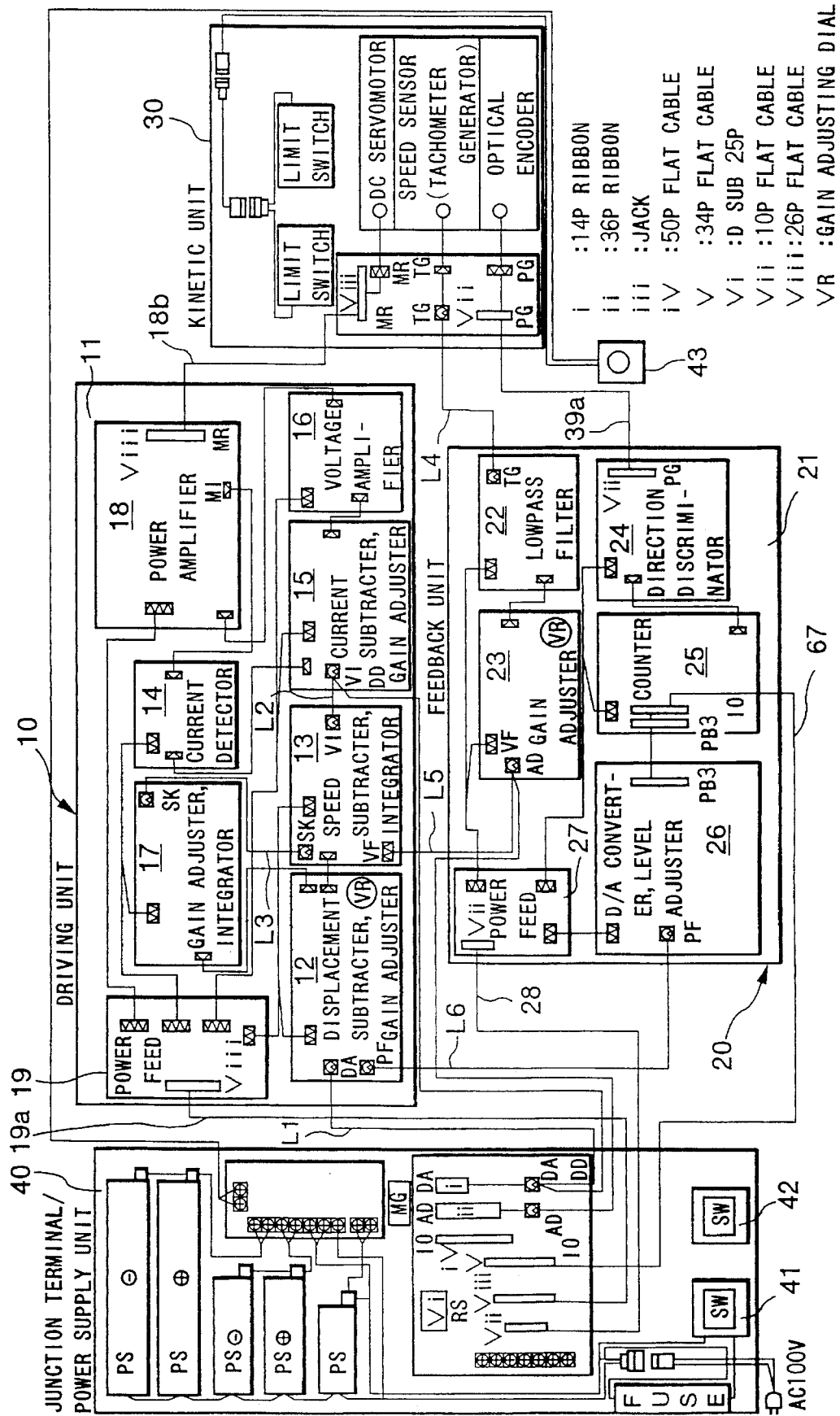
FIG. 2 is a block diagram of the educational mechatronics apparatus embodying the present invention.

Preferred embodiments of the present invention will be described in detail hereinafter with reference to the accompanying drawings. FIGS. 1 and 2 show the general configuration of an educational mechatronics apparatus in one embodiment according to the present invention. Various components of an automatic control system other than a junction terminal/power supply unit 40 and a computer 50 are divided into three units, i.e., a driving unit 10, a feedback control unit 20 and a kinetic unit 30, to enable the understanding of signal transfer and the function of the system. A one-chip microcomputer is used as the computer 50 to enable the study of the microcomputer 50. Naturally, a personal computer may be used as the computer 50 instead of the one-chip microcomputer.

(1) Driving Unit and Feedback Unit

As shown in FIG. 2, each of the driving unit 10 and the feedback control unit 20 comprises a plurality of circuit boards arranged in a planar arrangement. Each of the circuit boards corresponds to each of functional blocks (FIG. 1) shown in a block diagram of an automatic control system.

The driving unit 10 comprises a circuit board 12 (FIG. 6) provided with a displacement subtracter and a gain adjuster, a circuit board 13 (FIG. 8) provided with a speed subtracter and an integrator/adder, a circuit board 14 (FIG. 9) provided with a current detector, a circuit board 15 (FIG. 10) provided with a current subtracter and a gain adjuster, a voltage amplification circuit board 16 (FIG. 11), a circuit board 17 (FIG. 12) provided with an integrator and a gain adjuster, and a circuit board 18 (FIG. 13) provided with a power amplifier. All of these boards are arranged on a base board 11 formed of a metal.

The feedback control unit 20 comprises a circuit board 22 (FIG. 14) provided with a lowpass filter, a circuit board 23 (FIG. 15) provided with a gain adjuster, a circuit board 24 (FIG. 16) provided with a direction discriminator, a circuit board 25 (FIG. 14) provided with a counter, and a circuit board 26 (FIG. 18) provided with a D/A converter and a level adjuster. All of these boards are arranged on a base board 21 formed of a metal.

(a) Input and Output Terminals

The arrangement of the circuit boards 12 to 18 and the circuit boards 22 to 26 is the same as that of the blocks in the block diagram of the automatic control system. Each of the circuit boards 12 to 18 and the circuit boards 22 to 26 is provided with at least one input terminal such as a jack with screw, a tap or a connector, at its upstream end with respect to the direction of signal transfer, and with an output terminal such as a jack with screw, a tap or a connector, at its downstream end with respect to the direction of signal transfer.

Each of the circuit boards 12 to 18 and the circuit boards 22 to 26 is mounted on posts 101 and fastened thereto by screws 101a as shown in FIG. 7, in which the displacement subtraction/gain adjustment board 12 is shown by way of example with various components (generally indicated at 102) of circuits carried thereon. These components are specifically illustrated in FIGS. 6(B) to 13(B) and FIGS. 14(B) to 18(B). The circuits should be the same as those given in a textbook and not including unessential circuits, such as protective circuits, and printed wires are arranged on the back surfaces of the circuit boards to facilitate understanding the circuit components of the circuit boards. Since circuit boards 12 to 18 and the circuit boards 22 to 26 can be detached from the posts 101 by removing the screws 101a and the circuit boards can be disconnected from each other, the circuit boards can be replaced with other circuit boards fabricated originally by the learner.

Figure 6A:
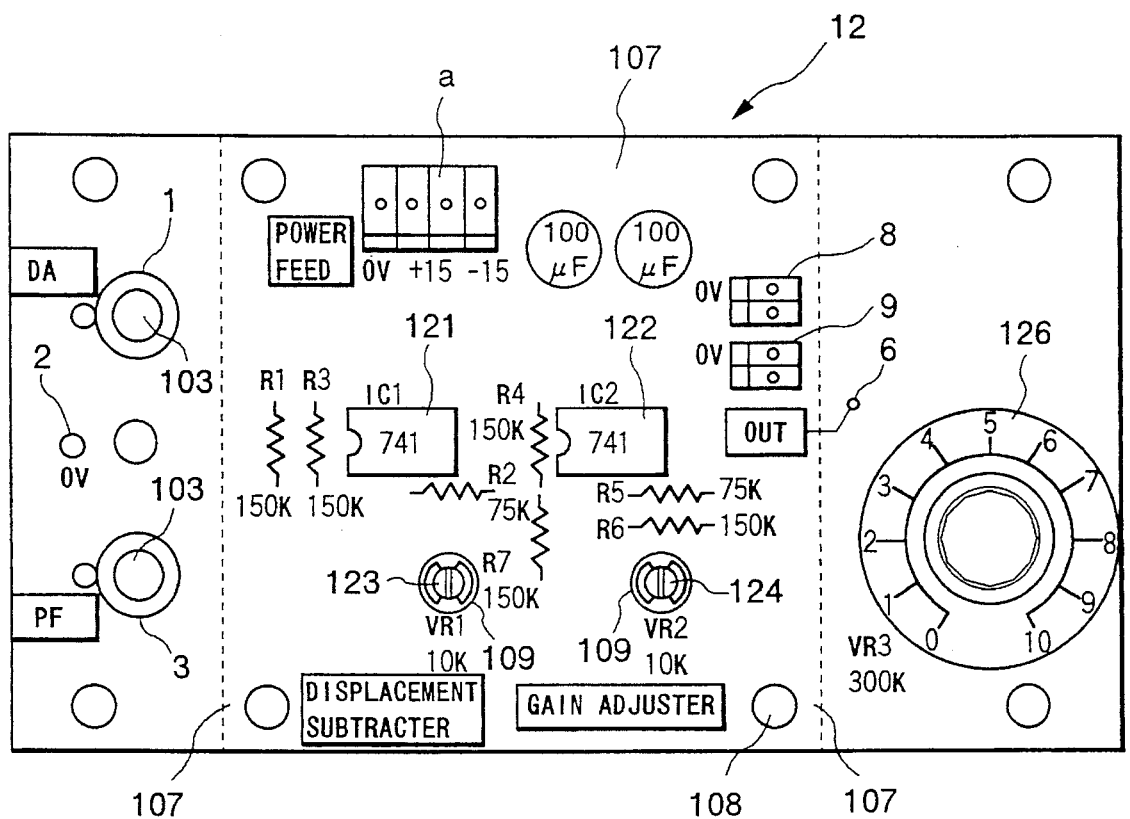
FIG. 6(A) is a plan view of a circuit board provided with a displacement subtracter and a gain adjuster included in the driving unit of FIG. 2.
Figure 6B:
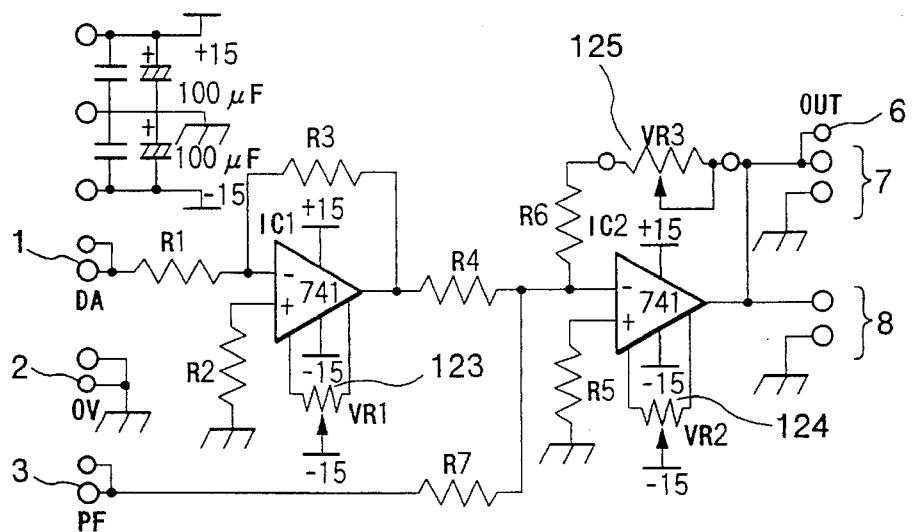
FIG. 6(B) is a circuit diagram of the circuit board of FIG. 6 (A)

Referring to FIG. 6(A) showing the circuit board 12 provided with the displacement subtracter and the gain adjuster, on the circuit board are arranged the circuit components including an operational amplifier 121 included in a displacement subtracter, an operational amplifier 122 included in a gain adjuster, variable resistors 123, 124 and 125 for adjusting the levels of the operational amplifiers 121 and 122, and a gain adjusting dial 126 for operating the variable resistor 125. Also mounted on the board 12 are a first input terminal 1 (a jack with screw in the illustrated example) to be connected to the output terminal of a D/A converter, an input tap 2 for a feeder cable, a second input terminal 3 (a jack with screw in the illustrated example) for a position feedback PF, an output tap 5 and output connectors 7 and 8. The gain adjusting dial 126 is disposed in the lowermost area of the circuit board 12.

As seen from FIG. 7, the jack with screw for the input terminals 1 and 3 and the output terminal 4 comprises a fixed projection 104 coaxially provided with a hole 103 for receiving the plug of a lead provided with plugs at its opposite ends (in this embodiment, a cable provided with banana plugs at its opposite ends), and an internally threaded fastener 105 provided with an internal thread, and capable of being screwed on an externally threaded portion of the fixed projection 104 to hold a conductive wire between the fastener 105 and the fixed projection 104.

Figure 3:
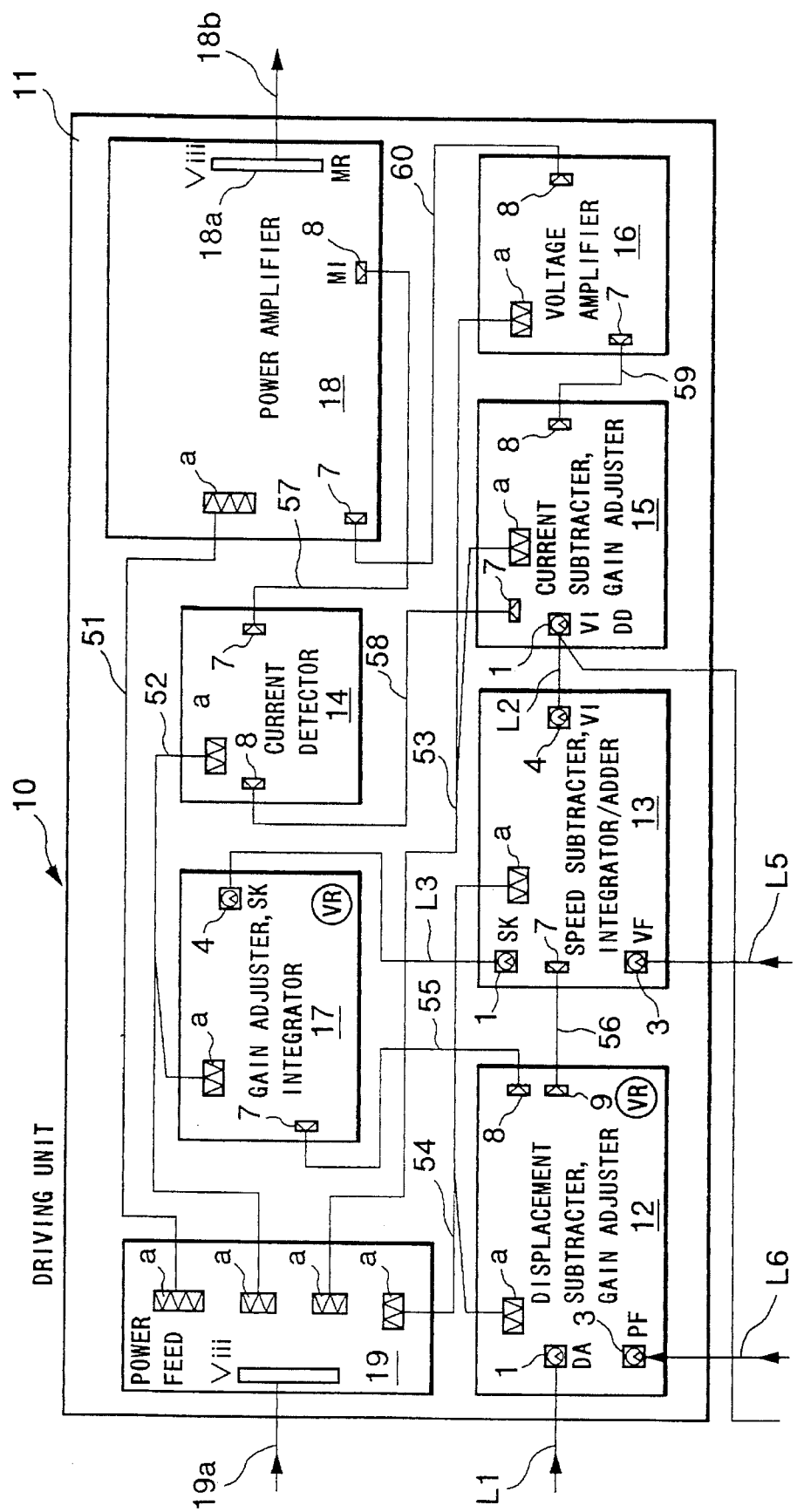
FIG. 3 is an enlarged block diagram of a driving unit shown in FIG. 2.
Figure 4:
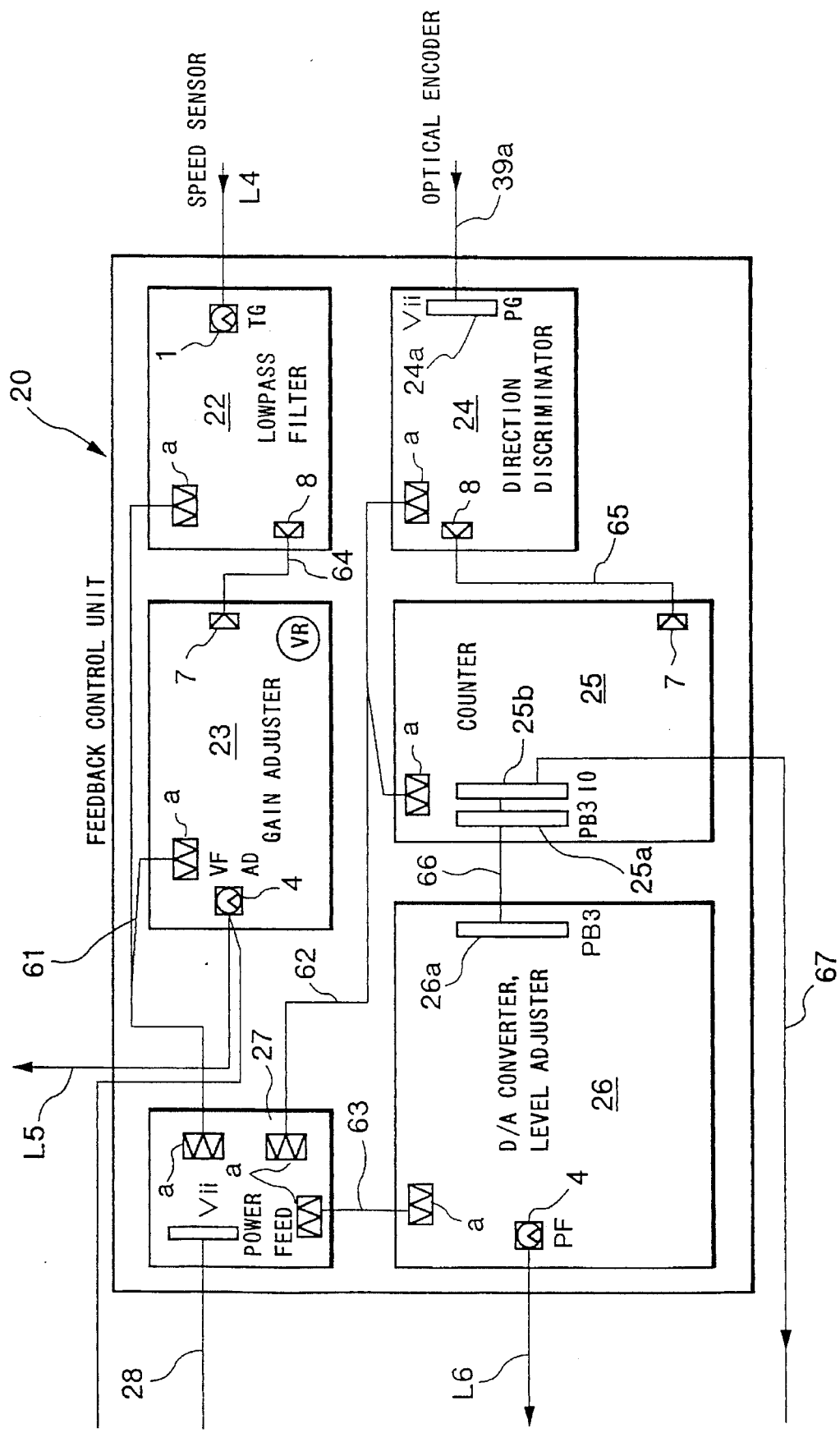
FIG. 4 is an enlarged block diagram of a feedback control unit shown in FIG. 2.
Figure 5:
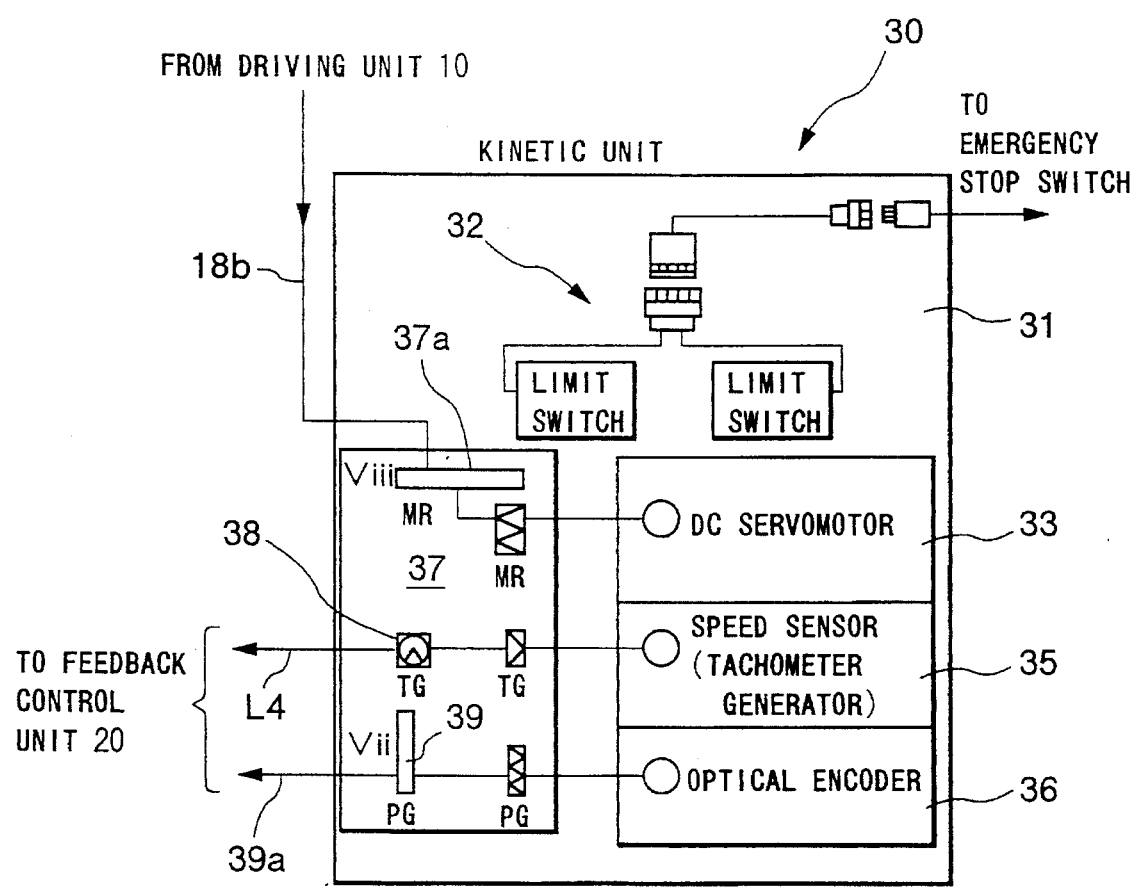
FIG. 5 is an enlarged block diagram of a kinetic unit shown in FIG. 2.

FIGS. 3 and 4 are enlarged plan views of the driving unit 10 and the feedback control unit 20, respectively. Signals are transferred from the left to the right in the circuit boards 12 to 18 excluding the circuit board 14, and signals are transferred from the right to the left in the circuit boards 22 to 26.

Referring to FIG. 3 showing the driving unit 10, four power feed lines 51 to 54 are extended from a connector plate 19 connected to the junction terminal/power supply unit 40 by a 20P flat cable 19a to feed power to the circuit boards 12 to 18. Although it is desirable, from the viewpoint of educational effect, to connect the circuit boards 12 to 18 in series by a power feed line, in the illustrated example the circuit boards are connected to the four power feed lines 51 to 54, respectively extended from the connector plate 19 to avoid noise generation by a loop. In FIG. 3, indicated at "a" are connectors for the power feed lines 51 to 54.

Each of the circuit boards 12 to 18 is provided with an input connector 7 in its upstream end and with an output connector 8 or 9 in its downstream end. The output connectors 8 and 9 of the circuit board 12 are connected to the input connector 7 of the circuit board 17 and the input connector 7 of the circuit board 13 by lines 55 and 56, respectively. The output connector 8 of the circuit board 18 is connected to the input connector 14 of the circuit board 14 by a line 57, the output connector 8 of the circuit board 14 is connected to the input connector 7 of the circuit board 15 by a line 58, the output connector 8 of the circuit board 15 is connected to the input connector 7 of the circuit board 16 by a line 59, and the output connector 8 of the circuit board 16 is connected to the input connector 7 of the circuit board 18 by a line 60.

Referring to FIG. 4 showing the feedback control unit 20, three power feed lines 61 to 63 are extended from a connector plate. 27 connected to the junction terminal/power supply unit 40 by a 10P flat cable 28 to feed power to the circuit boards 22 to 26. Each of the circuit boards 22 to 26, similarly to those of the driving unit 10, is provided with an input connector 7 in its upstream end with respect to the direction of signal transfer, and an output connector 8 or 9 in its downstream end.

The output connector 8 of the circuit board 22 is connected to the input connector 7 of the circuit board 23 by a line 64, and the output connector 8 of the circuit board 24 is connected to the input connector 7 of the circuit board 25 by a line 65. Sixteen-bit counter output connectors 25a and 25b of the circuit board 25 are connected to an input connector 26a of the circuit board 26 and an I/O interface terminal of the junction terminal/power supply unit 40 by a bus line 66 and a 34P flat cable 67, respectively.

(b) Transparent Protective Plates

As mentioned above, some circuit components inhibit the learner from operating them; that is, some circuit components have no direct relation with learning and might cause problems if they are operated. Examples of such components are level adjusting variable resistors 123 and 124 (of which operation causes undesirable variation of set values), and IC chips that might cause internal failure due to static electricity if they are inserted in or removed from the circuits. Accordingly, a center area including such circuit components of each circuit board is covered with a transparent protective plate 107 formed of a plastic material to inhibit the learner from touching those circuit components. Thus, as shown in FIG. 6, the circuit components in the center area of the circuit board 12, i.e., the circuit components other than the input and output terminals 1, 2, 3, 5 and 6 as well as the gain adjusting dial 126 arranged in opposite end portions of the board, are covered with the transparent protective plate 107 which is supported by posts 106 fixed to the circuit board 12 and is fastened to the upper ends of the posts 106 by screws 108 as shown in FIG. 7.

The transparent protective plate 107 enables the learner to recognize the circuit components 102 visually and prevents the IC chips 121 and 122, the variable resistors 123 and 124, the connectors 8 and 9 and such from being operated carelessly by the learner. The transparent protective plate 107 is provided with through holes 109 for passing a screwdriver therethrough at positions corresponding to operating shafts of the level adjusting variable resistors 123 and 124 to enable the designer or the teacher to operate the level adjusting variable resistors 123 and 124 for the fine adjustment of set values.

Figure 8A:
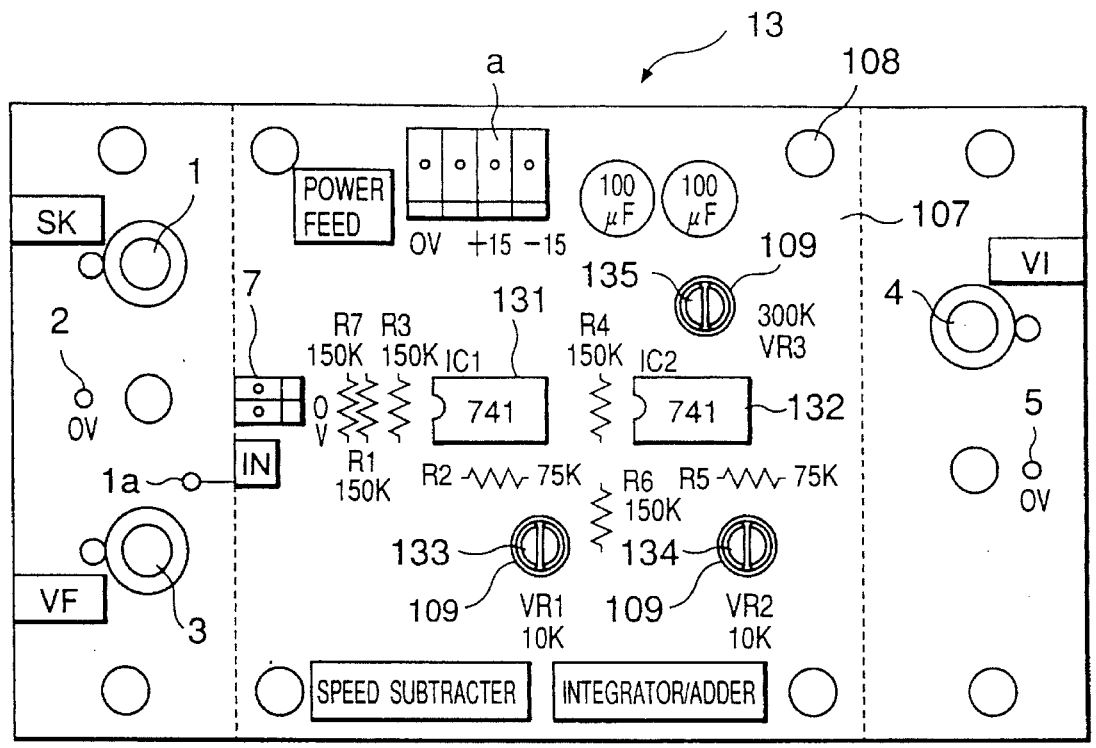
FIG. 8 (A) is a plan view of a circuit board provided with a speed subtracter and an integrator/adder included in the driving unit of FIG. 2.
FIG. 8(B) is a circuit diagram of the circuit board of FIG. 8(A)
Figure 8B:
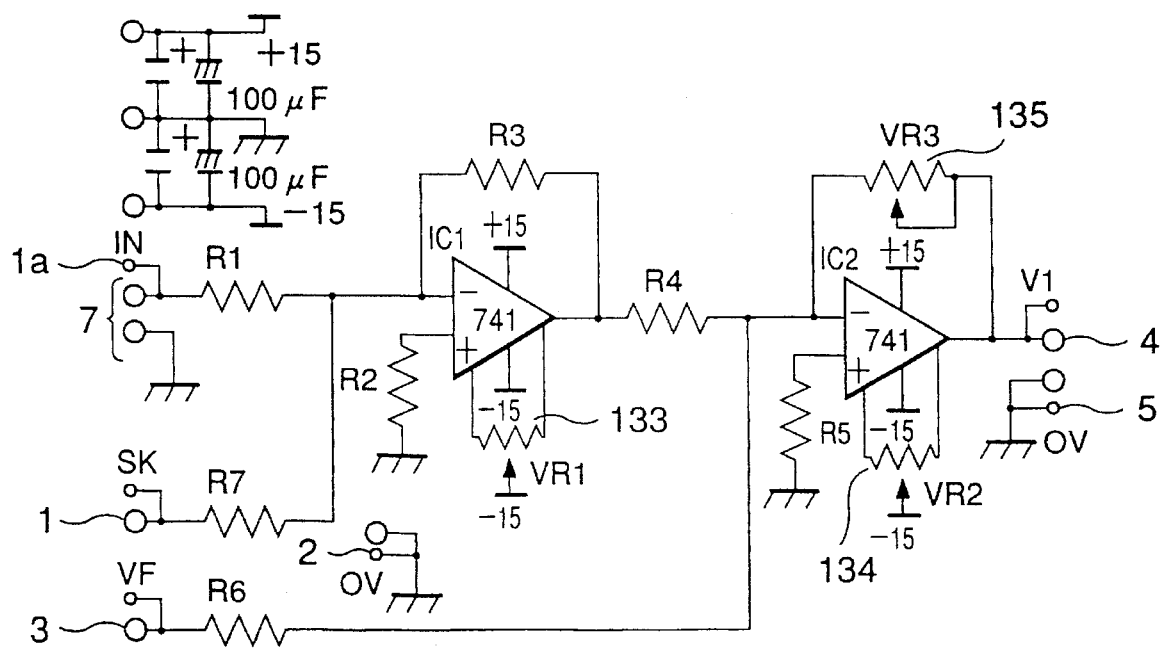

Referring to FIG. 8 showing the circuit board 13 provided with the speed subtracter and the integrator/adder, the transparent protective plate 107 covers various circuit components including an operational amplifier 131 included in a speed subtracter, an operational amplifier 132 included in an integrator/adder, variable resistors 133, 134 and 135, and an input connector 7. The input and output terminals 1, 2, 3, 4 and 5 arranged in the opposite end portions of the circuit board 13 are not covered by the transparent protective plate 107. The transparent protective plate 107, similarly to that shown in FIG. 7, is provided with through holes 109 through which to pass a screwdriver in adjusting the respective resistances of the three variable resistors 133 to 135. Indicated at 1a is an input tap located in one end of the circuit board 13.

Figure 9A:
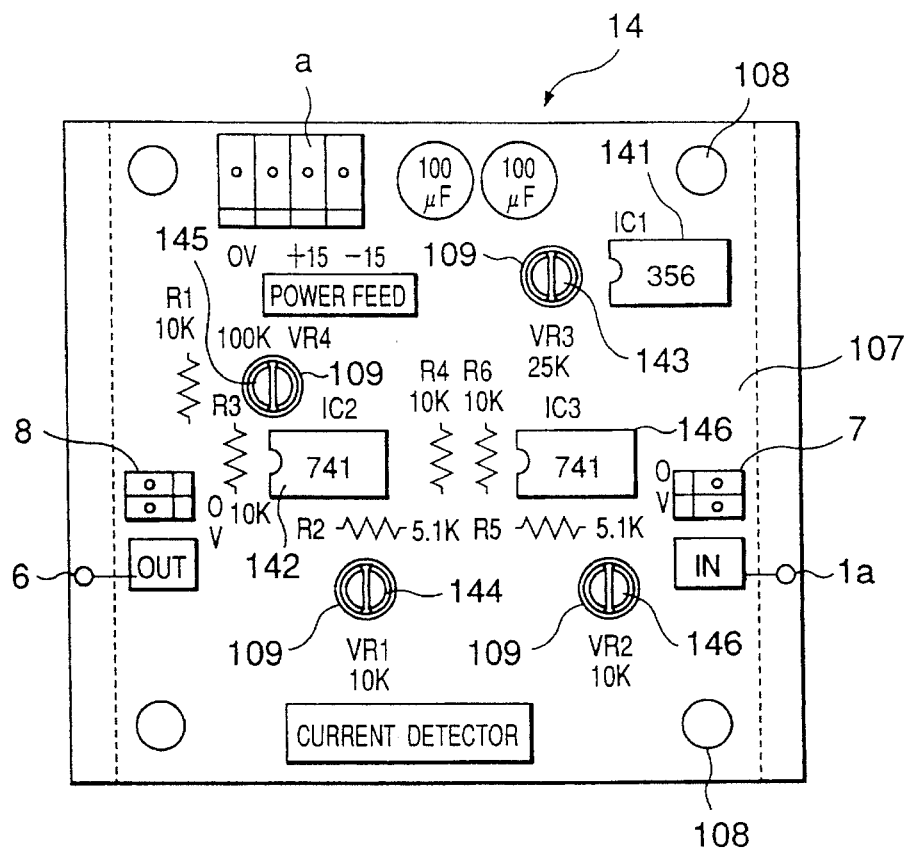
FIG. 9(A) is a plan view of a circuit board provided with a current detector included in the driving unit of FIG. 2.
Figure 9B:
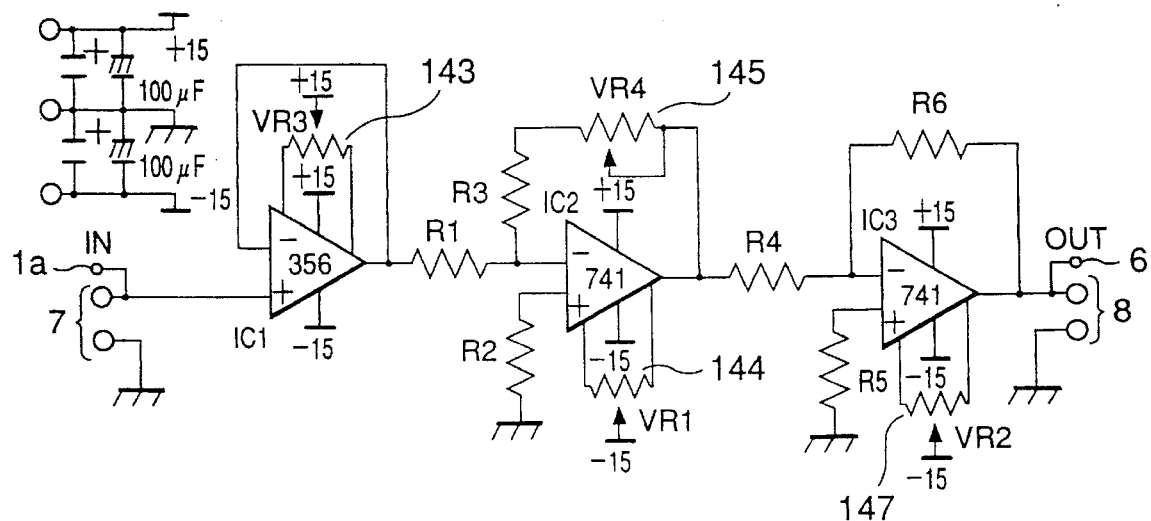
FIG. 9(B) is a circuit diagram of the circuit board of FIG. 9(A)

Referring to FIG. 9 showing the current detection circuit board 14, the center area of the circuit board 14, i.e. the area excluding the end portions where an input tap 1a and an output terminal 6 are located, is covered with the transparent protective plate 107. The transparent protective plate 107 is provided with four through holes 109 at positions corresponding to variable resistors 143, 144, 145 and 147 associated with operational amplifiers 141, 142 and 146 to pass a screwdriver therethrough in adjusting the respective resistances of the variable resistors 143, 144, 145 and 147.

Figure 10A:
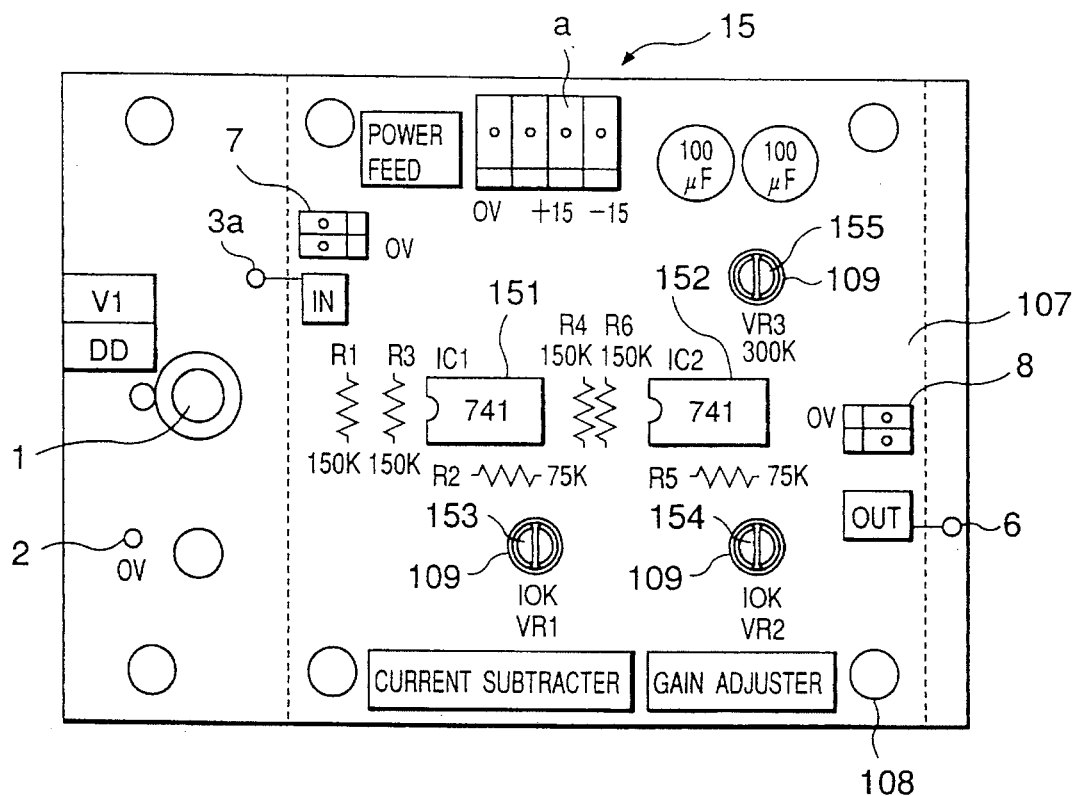
FIG. 10(A) is a plan view of a circuit board provided with a current subtracter and a gain adjuster included in the driving unit of FIG. 2.
Figure 10B:
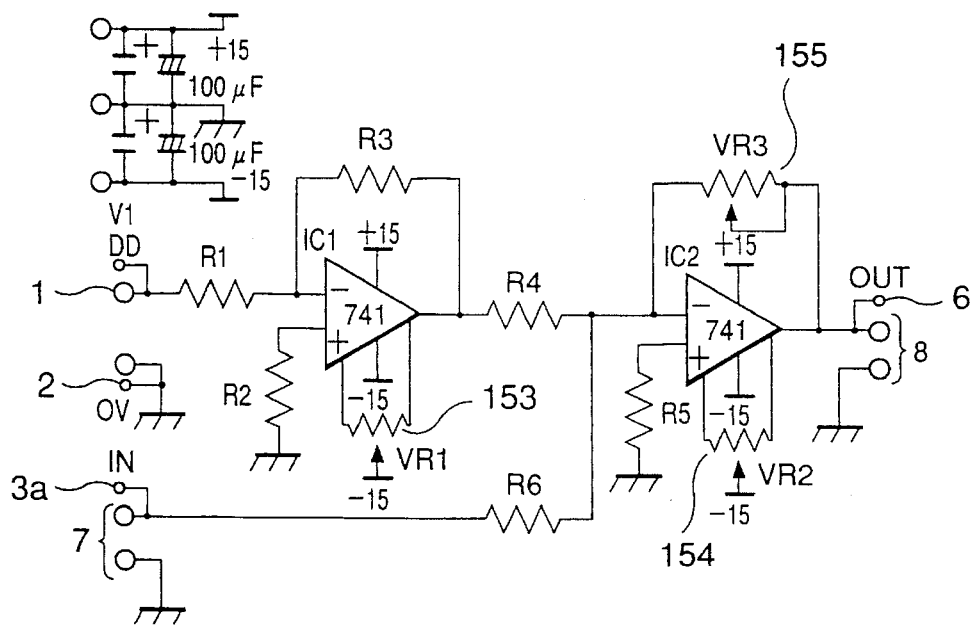
FIG. 10(B) is a circuit diagram of the circuit board of FIG. 10(A)

Referring to FIG. 10 showing the circuit board 15 provided with the current subtracter and the gain adjuster, the center area of the circuit board 15, i.e. the area excluding the end portions where input terminals 1 and 2 and an output terminal 6 are located, is covered with the transparent protective plate 107. Specifically, this transparent protective plate covers an operational amplifier 151 included in a current subtracter, an operational amplifier 152 included in a gain adjuster, variable resistors 153, 154 and 155 associated with the operational amplifiers 151 and 152, an input connector 7 and an output connector 8. The transparent protective plate 107, similarly to that shown in FIG. 7, is provided with three through holes at positions corresponding to the three variable resistors 153 to 155, respectively, to pass a screwdriver therethrough in adjusting the respective resistances of the variable resistors 153 to 155. Indicated at 3a is an input tap which is positioned at one end of the circuit board 15.

Figure 11A:
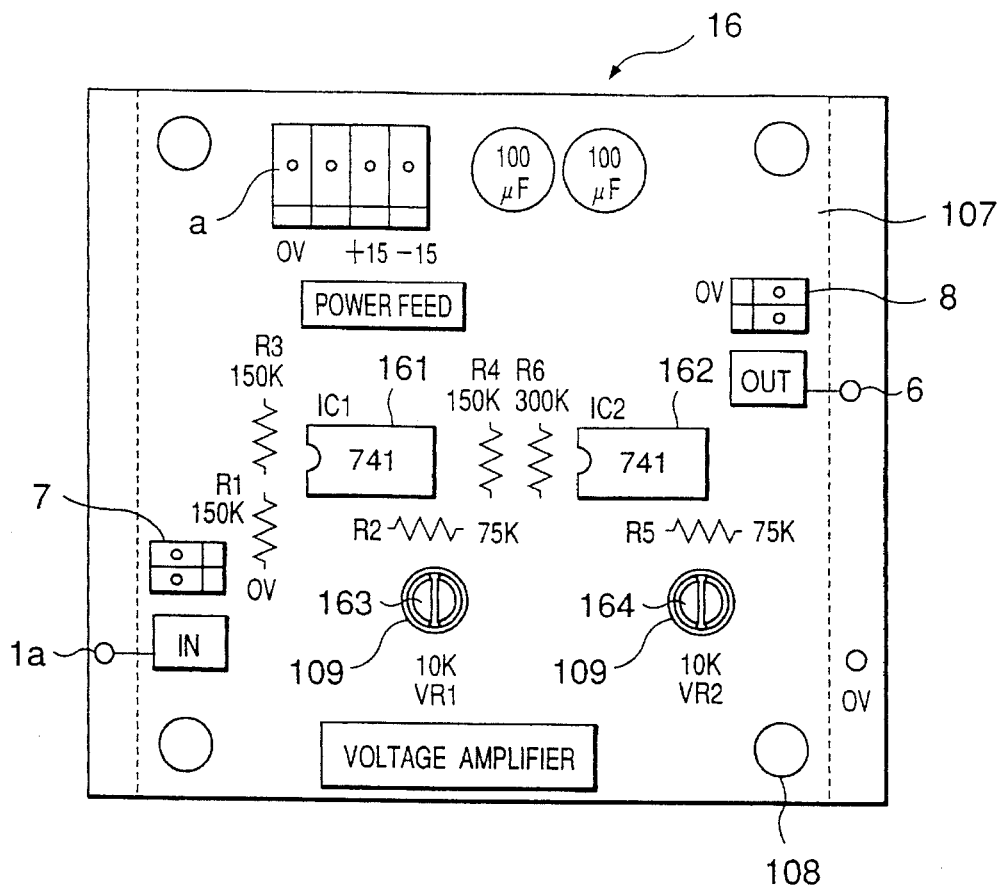
FIG. 11(A) is a plan view of a circuit board provided with a voltage amplifier included in the driving unit of FIG. 2.
Figure 11B:
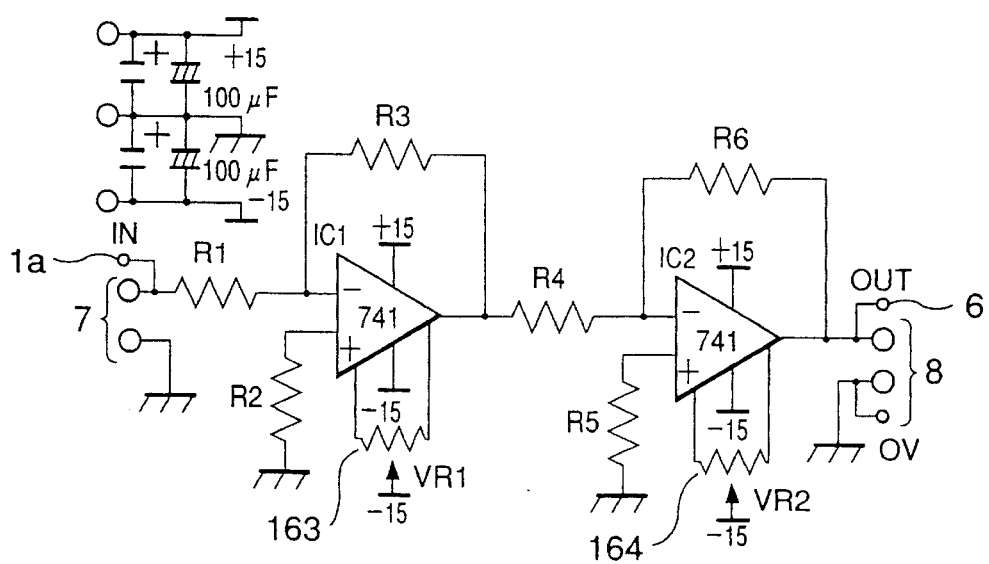
FIG. 11(B) is a circuit diagram of the circuit board of FIG. 11(A)

Referring to FIG. 11 showing the circuit board 16 provided with the voltage amplifier, all the circuit components excluding an input tap 1a and an output tap 6 are covered with the transparent protective plate 107 formed of the plastic material and provided with two through holes 109 at positions corresponding to variable resistors 163 and 164 associated with operational amplifiers 161 and 162 to pass a screwdriver therethrough in adjusting the respective resistances of the variable resistors 163 and 164.

Figure 12A:
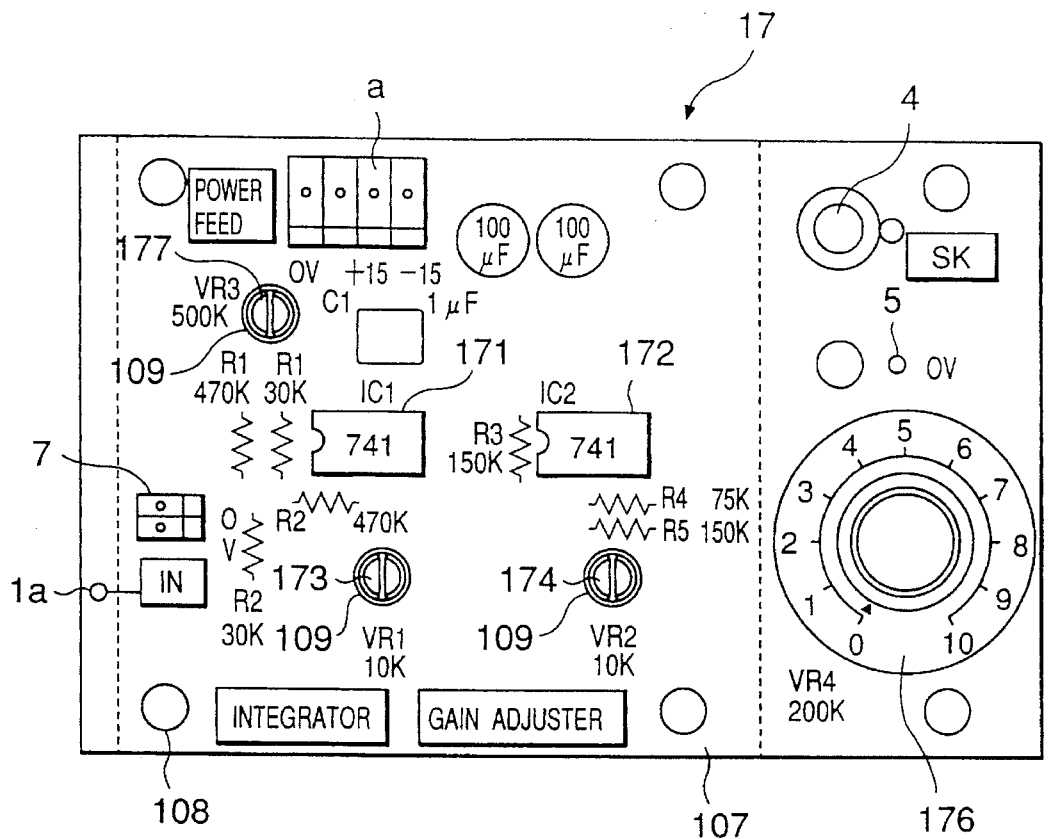
FIG. 12(A) is a plan view of a circuit board provided with an integrator and a gain adjuster included in the driving unit of FIG. 2.
Figure 12B:
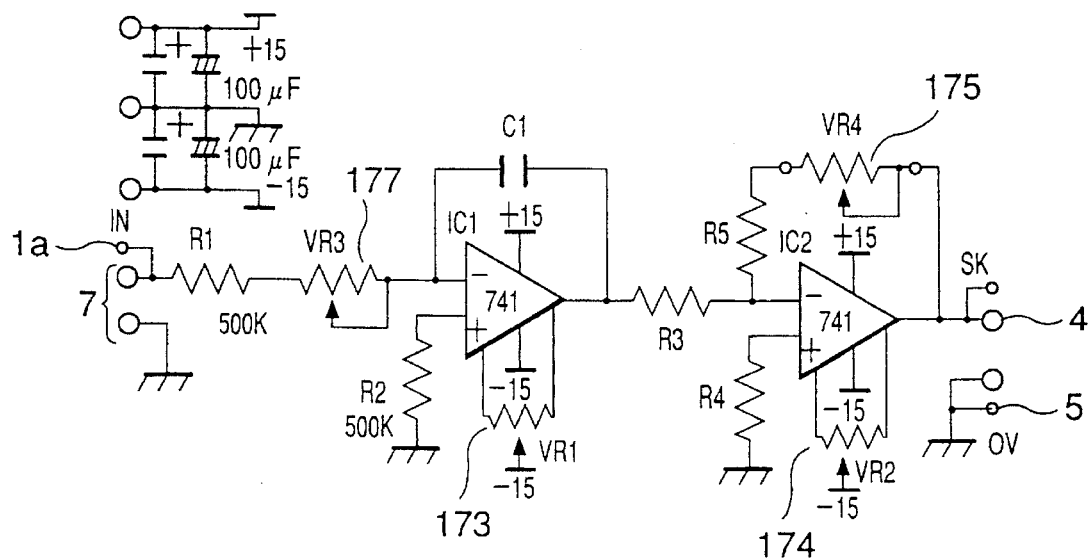
FIG. 12(B) is a circuit diagram of the circuit board of FIG. 12(A)

Referring to FIG. 12 showing the integration/gain adjustment circuit board 17, the circuit components other than an input tap 1a, output terminal 4, an output tap 5 and a gain adjusting dial 176 which are arranged in the opposite end portions of the circuit board 17, are covered with the transparent protective plate 107. That is, the transparent protective plate 107 covers an operational amplifier 171 included in an integrator, an operational amplifier 172 included in a gain adjuster, variable resistors 173, 174, 175 and 177 associated with the operational amplifiers 171 and 172, and an input connector 7. The transparent protective plate 107 is provided with three through holes 109 at positions corresponding to the three variable resistors 173, 174 and 177 to pass a screwdriver therethrough in adjusting the respective resistances of the variable resistors 173, 174 and 177.

Figure 13A:
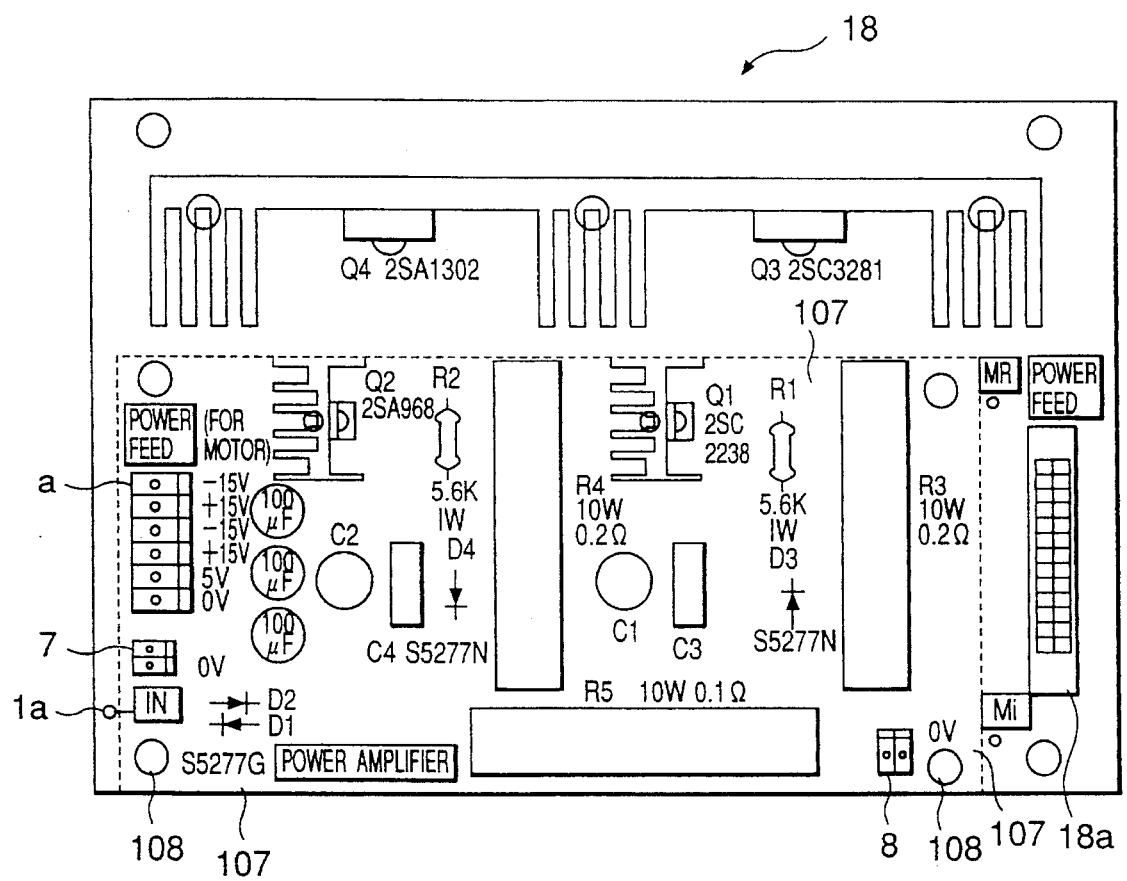
FIG. 13(A) is a plan view of a circuit board provided with a power amplifier included in the driving unit of FIG. 2.
Figure 13B:
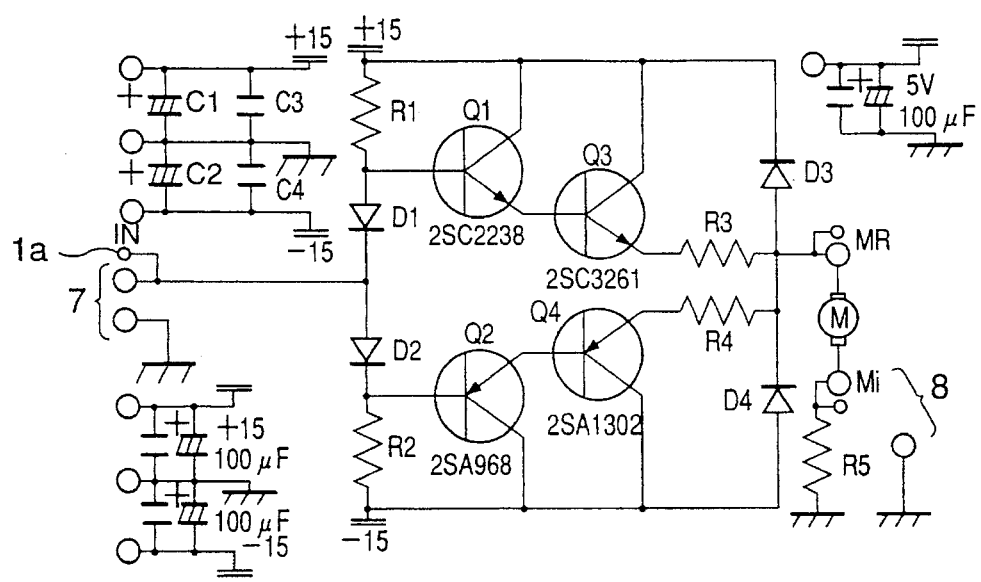
FIG. 13(B) is a circuit diagram of the circuit board of FIG. 13(A)

Referring to FIG. 13 showing the circuit board 18 provided with the power amplifier, the components excluding an input taps 1a and a 26P output connector 18a are covered with the transparent protective plate 107.

Figure 14A:
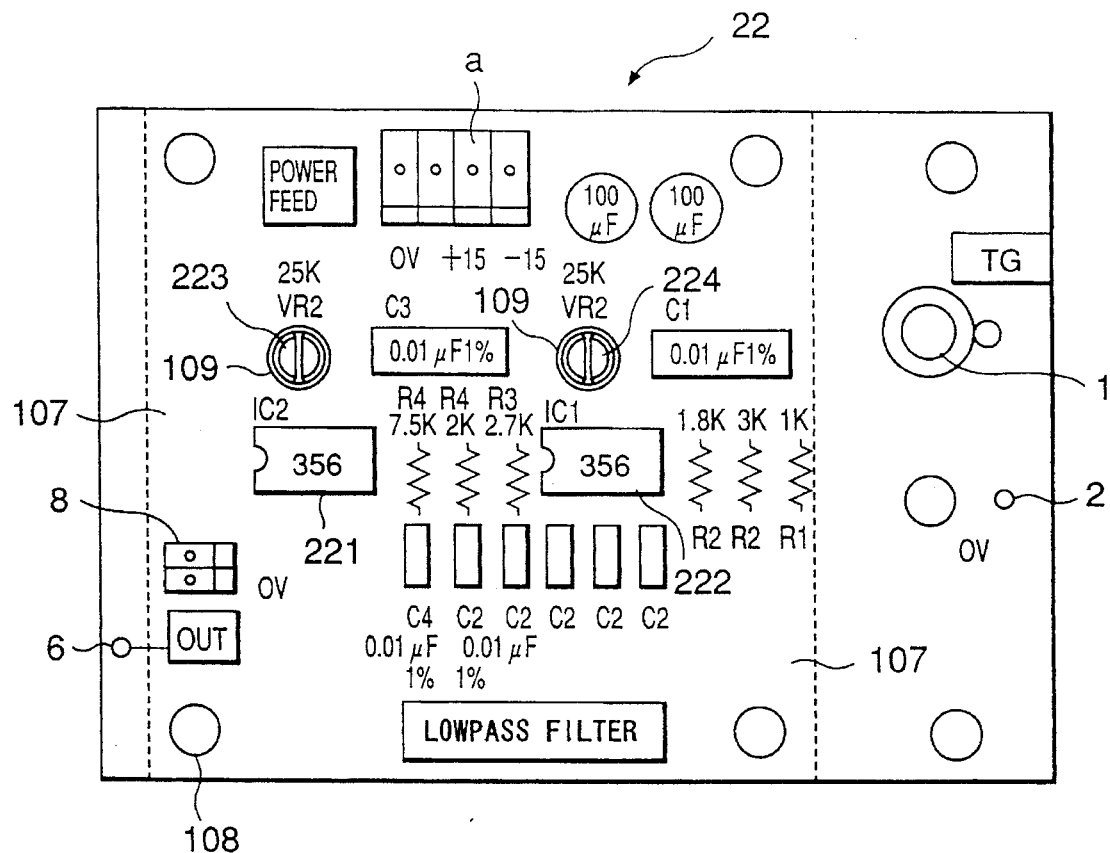
FIG. 14(A) is a plan view of a circuit board provided with a lowpass filter included in the feedback control unit of FIG. 2.
Figure 14B:
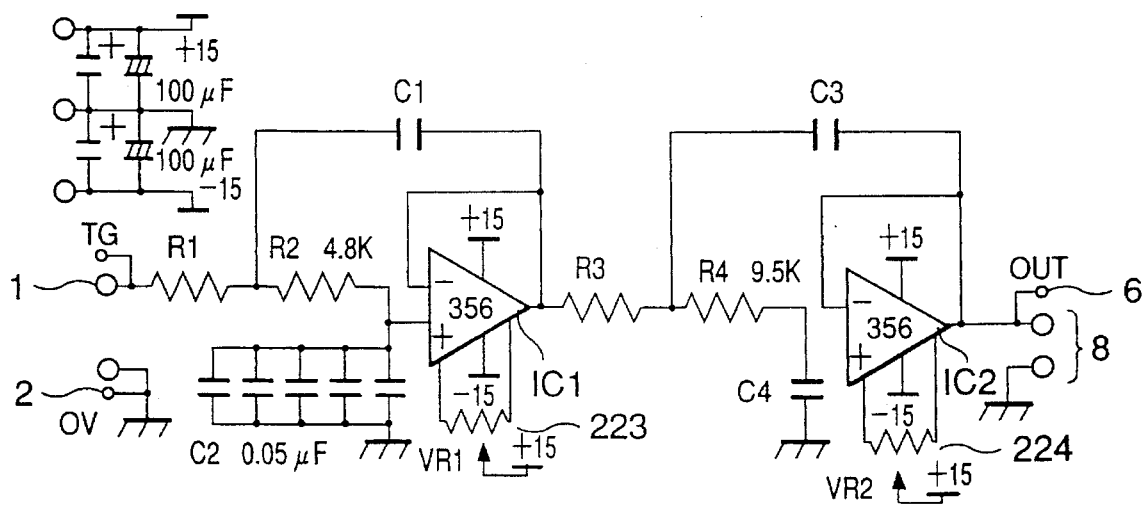
FIG. 14(B) is a circuit diagram of the circuit board of FIG. 14(A)

Referring to FIG. 14 showing the circuit board 22 provided with the lowpass filter of the feedback control unit 20, the transparent protective plate 107 covers operational amplifiers 221 and 222, variable resistors 223 and 224, and an input connector 7. The transparent protective plate 107 is provided with two through holes 109 at positions corresponding to the variable resistors 223 and 224 associated with the operational amplifiers 221 and 222 to pass a screwdriver therethrough in adjusting the respective resistances of the variable resistors 223 and 224.

Figure 15A:
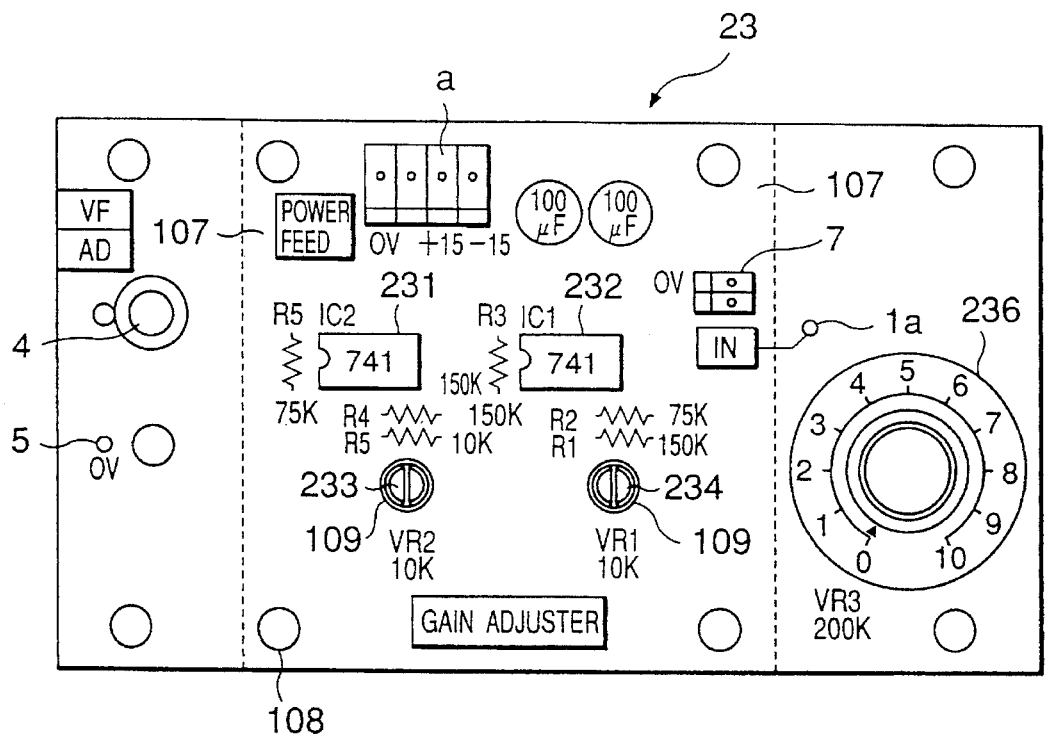
FIG. 15(A) is a plan view of a circuit board provided with a gain adjuster included in the feedback control unit of FIG. 2.
Figure 15B:
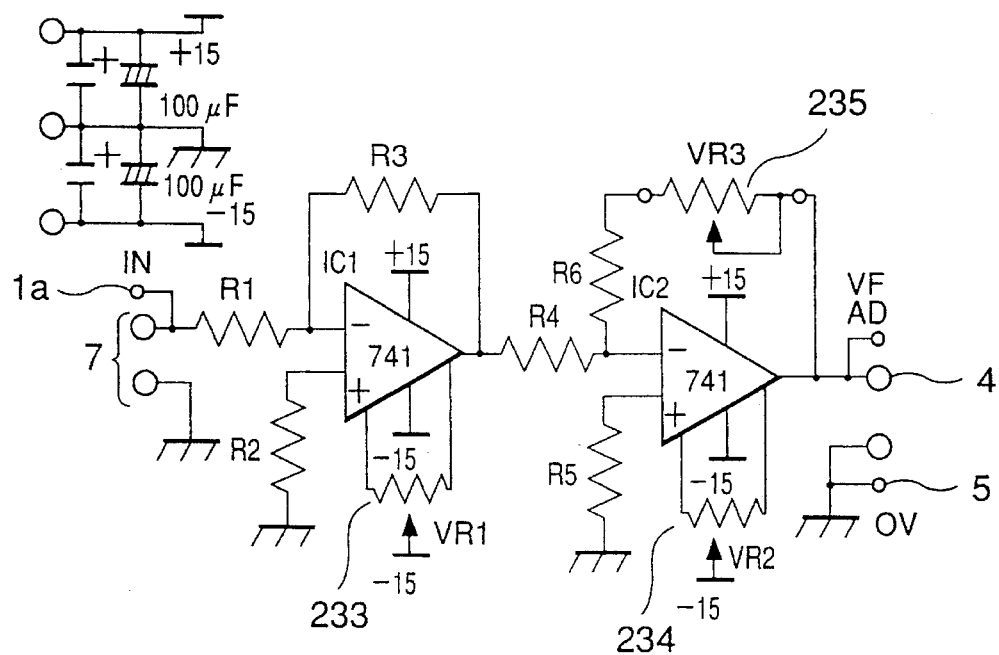
FIG. 15(B) is a circuit diagram of the circuit board of FIG. 15(A)

Referring to FIG. 15 showing the circuit board 23 provided with the gain adjuster, the transparent protective plate 107 covers the circuit components including operational amplifiers 231 and 232, variable resistors 223 and 224, and an input connector 7. An input tap 1a, an output terminal 4, an output tap 5 and a gain adjusting dial 236 associated with a variable resistor 235, are arranged in the opposite end portions of the circuit board 23 and remains uncovered by the plate 107. The transparent protective plate 107 is provided with two through holes 109 at positions corresponding to the variable resistors 233 and 234 associated with the operational amplifiers 231 and 232 to pass a screwdriver therethrough in adjusting the respective resistances of the variable resistor 233 and 234.

Figure 16A:
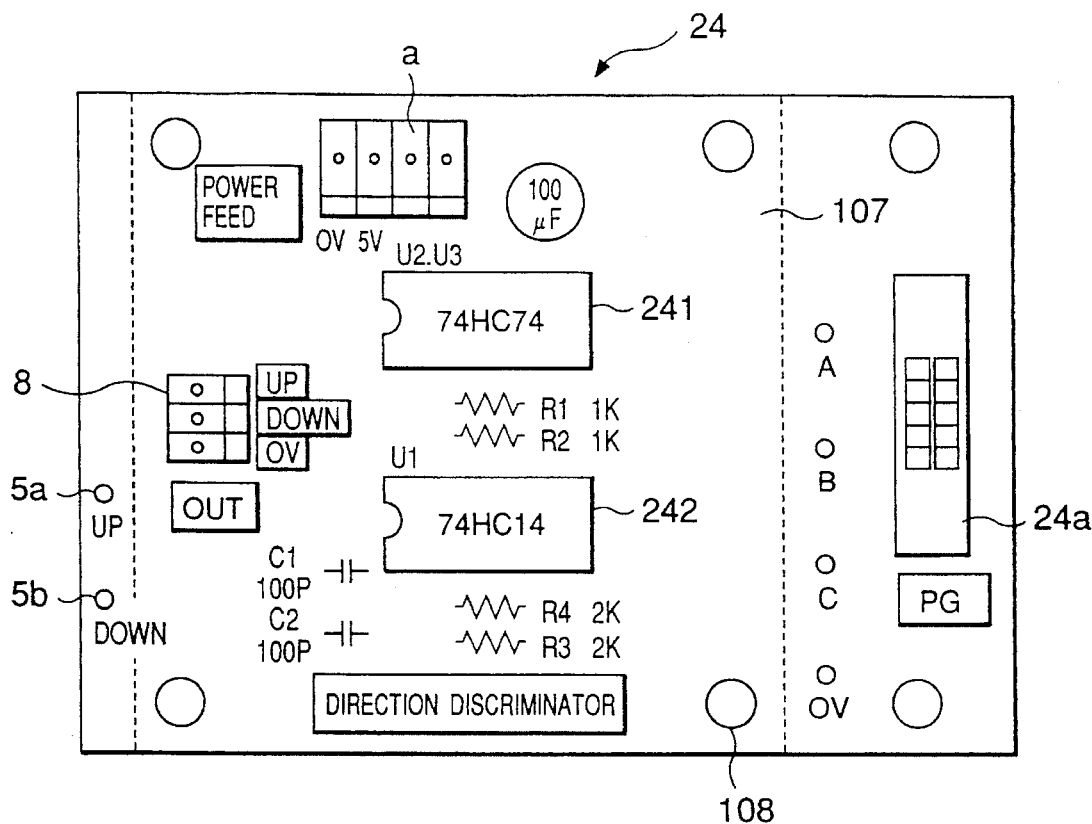
FIG. 16(A) is a plan view of a circuit board provided with a direction discriminator included in the feedback control unit of FIG. 2.
Figure 16B:
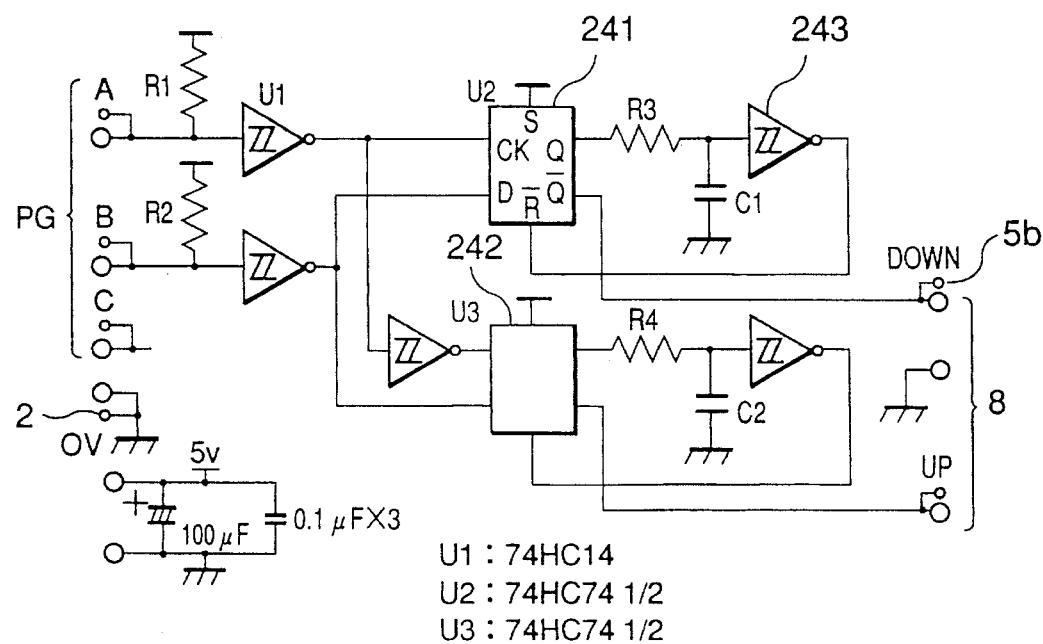
FIG. 16(B) is a circuit diagram of the circuit board of FIG. 16(A)

Referring to FIG. 16 showing the circuit board 24 provided with the direction discriminator, the transparent protective plate 107 covers two dual flip-flops 241 and 242, a Schmitt circuits 243 and an output connector 8, but does not cover A-phase, B-phase and C-phase PGs, an input connector 24a, an up-output tap 5a and a down-output tap 5b arranged in the opposite end portions of the circuit board 24.

Figure 17A:
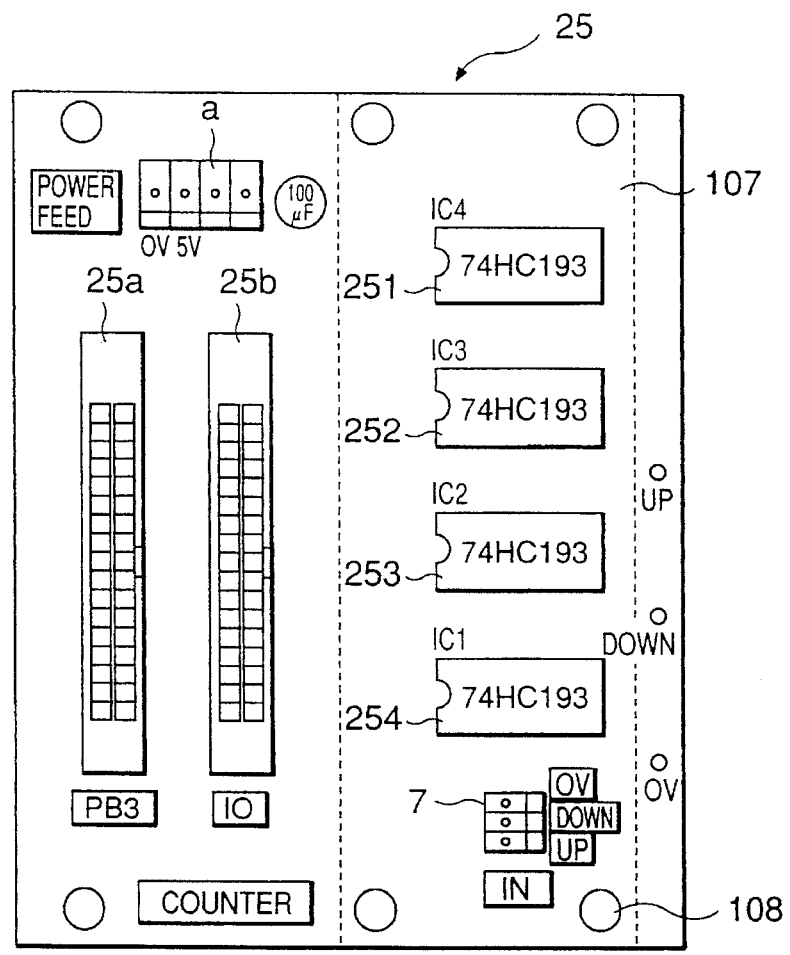
FIG. 17(A) is a plan view of a circuit board provided with a counter included in the feedback control unit of FIG. 2.
Figure 17B:
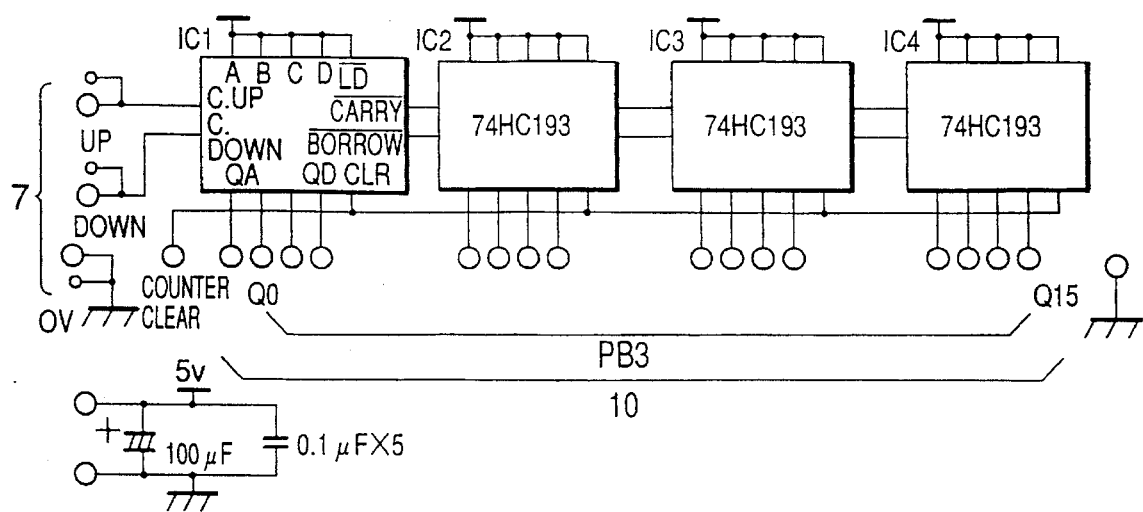
FIG. 17(B) is a circuit diagram of the circuit board of FIG. 17(A)

Referring to FIG. 17 showing the circuit board 25 provided with the counter, the transparent protective plate 107 covers the circuit components including counter ICs 251 to 254 and a counter input connector 7 and excluding a counter output connectors 25a and 25b which are located in one end portion of the circuit board 25.

Figure 18A:
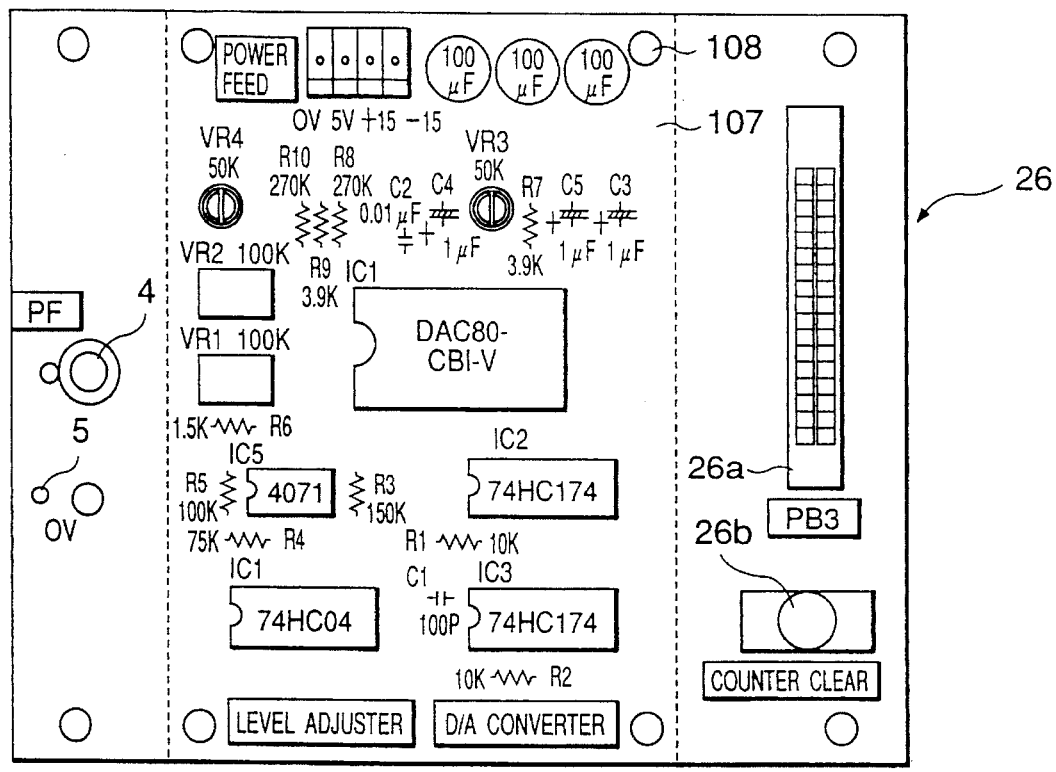
FIG. 18(A) is a plan view of a circuit board provided with a D/A converter and a level adjuster included in the feedback control unit of FIG. 2.
Figure 18B:
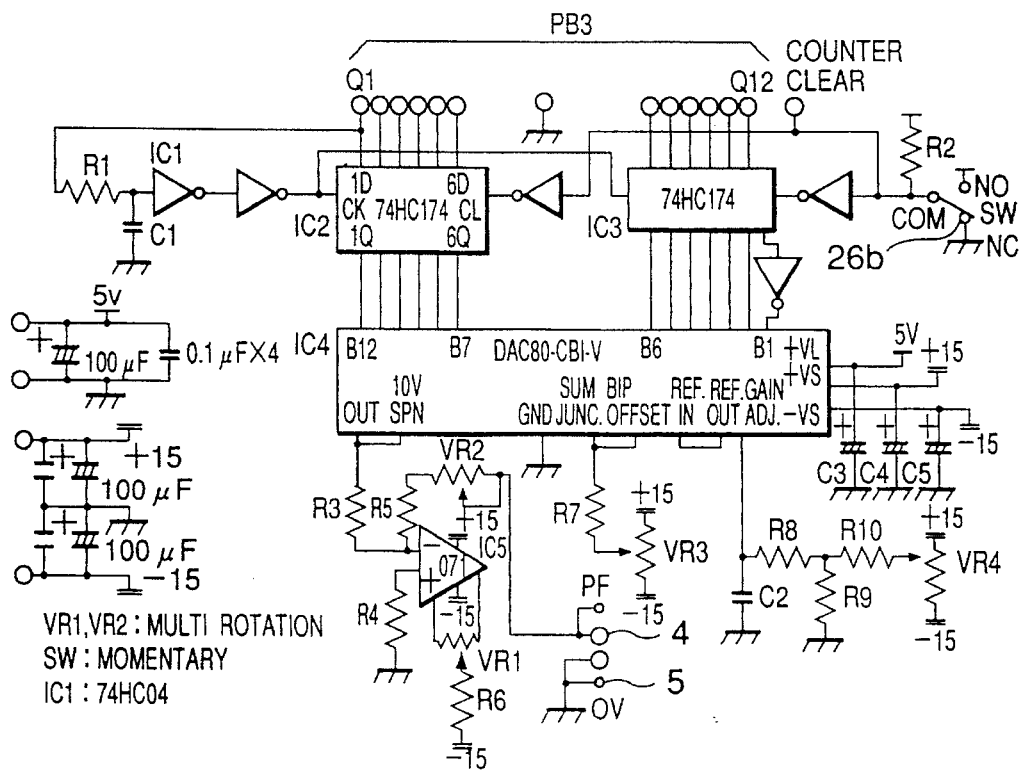
FIG. 18(B) is a circuit diagram of the circuit board of FIG. 18(A)

Referring to FIG. 18 showing the circuit board 26 provided with the D/A converter and the level adjuster, the transparent protective plate 107 covers all the circuit components other than a connector 26a, a counter clearing switch 26b, an output terminal 4 and an output tap 5.

As understood from the foregoing description, each circuit board has right and left end portions sandwiching the center area where various circuits components are arranged, and the flat, transparent protective plate 107 is supported on the posts so as to extend over the center area of the circuit board. Components to be operated by the learner, such as the terminals to which connecting cords are to be connected, terminals to be used for checking voltage and such, and the dial for gain adjustment, are arranged in the opposite end portions. The printed wires are arranged on the back surface of each circuit board and the circuit board is spaced apart from the base board by the posts, so that the circuit boards can distinctly be distinguished from each other.

(2) Kinetic Unit

The kinetic unit 30 comprises a motion mechanism 32, a DC servomotor 33, a reduction gear 34 driven by the DC servomotor 33, a speed sensor 35 such as a tachometer generator, an optical encoder 36, i.e., a displacement sensor, a junction board 37, and a base board 31 supporting those components. The junction board 37 is provided with a 26P input connector 37a connected to the DC servomotor 33. The output connector 18a of the circuit board 18 is connected to the input connector 37a by a flat cable 18b to feed power to the DC servomotor 33 from the circuit board 18. The junction board 37 is provided further with a TG output terminal 38 connected to the speed sensor 35, and a 10P PG output terminal 39 connected to the optical encoder 36. The 10P PG output terminal 39 is connected to the PG input terminal 24a of the circuit board 24 of the feedback control unit 20 by a 10P flat cable 39a. The TG output terminal 38 connected to the speed sensor 35 can be connected to the TG input terminal 1 of the circuit board 22 by a lead L4 by the learner.

One of the following four mechanisms is used selectively as the motion mechanism 32 of the kinetic unit 30.

1) Belt-and-Pulley Mechanism

A belt-and-pulley mechanism is used for rotating the rotary platen of a printer and hence an effective teaching material.

Figure 19:
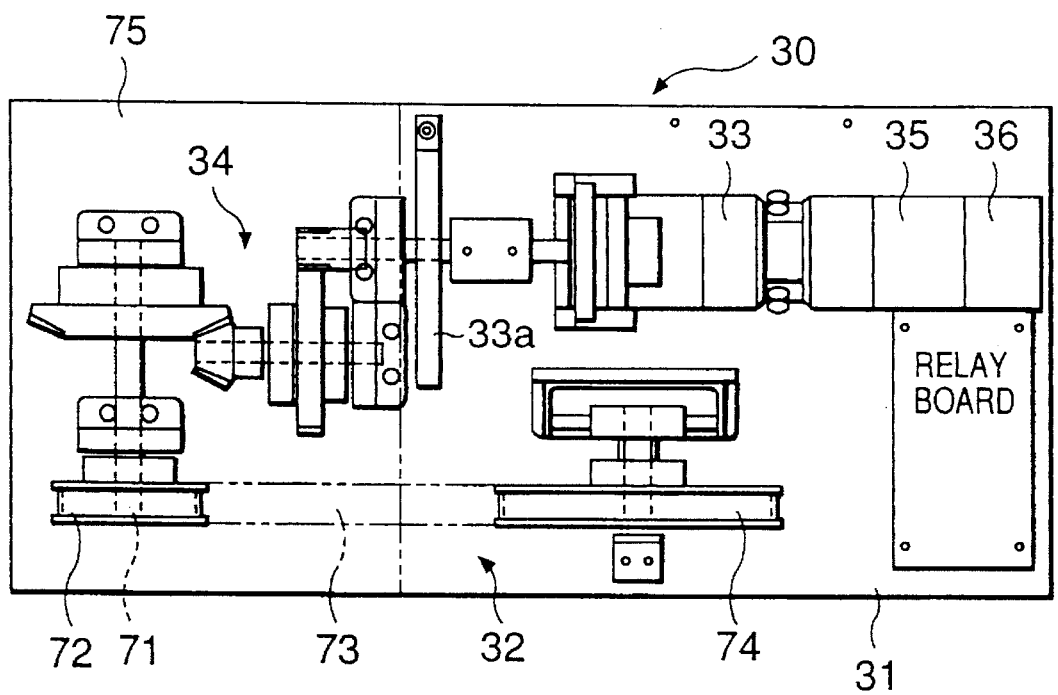
FIG. 19 is a plan view of a kinetic unit provided with a belt-and-pulley mechanism.
Figure 20:
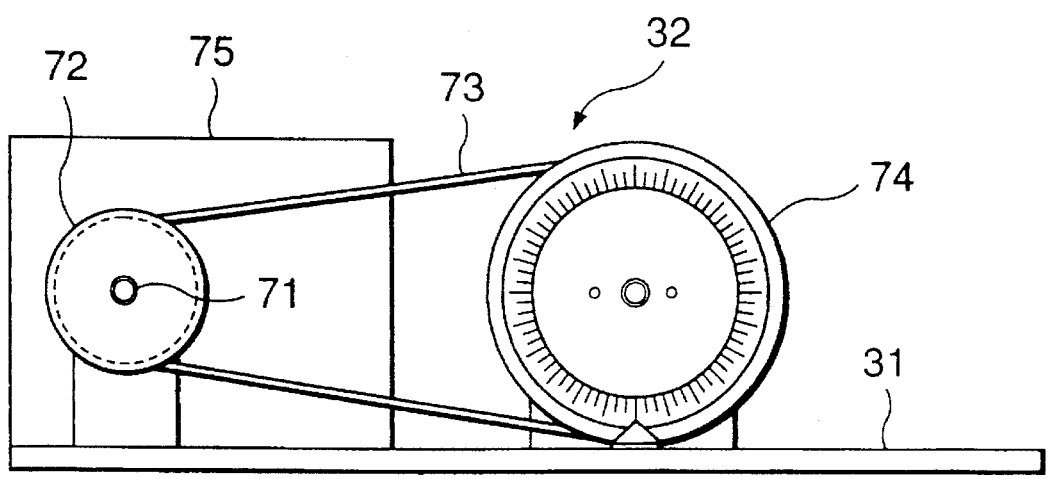
FIG. 20 is a front view of the kinetic unit of FIG. 19.

Referring to FIGS. 19 and 20, the DC servomotor 33, the speed sensor (tachometer generator) 35 and the optical encoder 36 are arranged coaxially in that order with their shafts directly coupled together. The output shaft of the DC servomotor 33 is connected to the input shaft of the reduction gear 34, and the output shaft of the reduction gear 34 is connected to a rotatory shaft 71 supporting a pulley 72 included in the belt-and-pulley mechanism, i.e., the motion mechanism 32. The belt-and-pulley mechanism has a larger pulley 74, and a toothed belt 73 is extended between the pulley 72 and the larger pulley 74 to rotate the larger pulley 74 by the pulley 72. The reduction gear 34 and part of the motion mechanism 32 are covered with a transparent box 75 formed of a plastic material and having a rectangular shape to prevent the careless touch of the learner to the motion mechanism 32 and to protect the learner from danger.

It is desirable to teach the learner an automatic control technique for vibration suppression in addition to an automatic control technique for positioning. The DC servomotor 33 operates at 3000 rpm which is a normal speed of this motor. It is however dangerous to operate the motion mechanism at such a high speed. Thus, in this example, the output of the DC servomotor 33 is transmitted to the motion mechanism through reduction gears that reduce the speed to $\frac{1}{15}$ of the rotational speed of the motor. However, when the motion mechanism is operated at such a low speed, it does not generate vibrations, which are necessary for learning. Accordingly, an inertial disk 33a is mounted on the output shaft of the DC servomotor 33 to generate vibrations intentionally and to realize a structure that stops vibrating when controlled in a speed feedback control mode. This structure is applied also to a slider crank chain mechanism, a four-bar linkage mechanism and a ball-screw feed mechanism, which will be described later.

The DC servomotor 33 is of 60 W in rated output capacity. However, a current that makes the DC servomotor 33 operate as a 30 W motor is supplied to the DC servomotor 33 in order that the DC servomotor 33 is able to withstand highly frequent use at school or the like. Naturally, transistors having a sufficient design margin are employed in a driving circuit for driving the DC servomotor 33 to avoid risk of burning.

2) Slider Crank Mechanism

A slider crank chain mechanism is employed in automobiles, steam engines and machine tools and is a useful teaching material.

Figure 21:
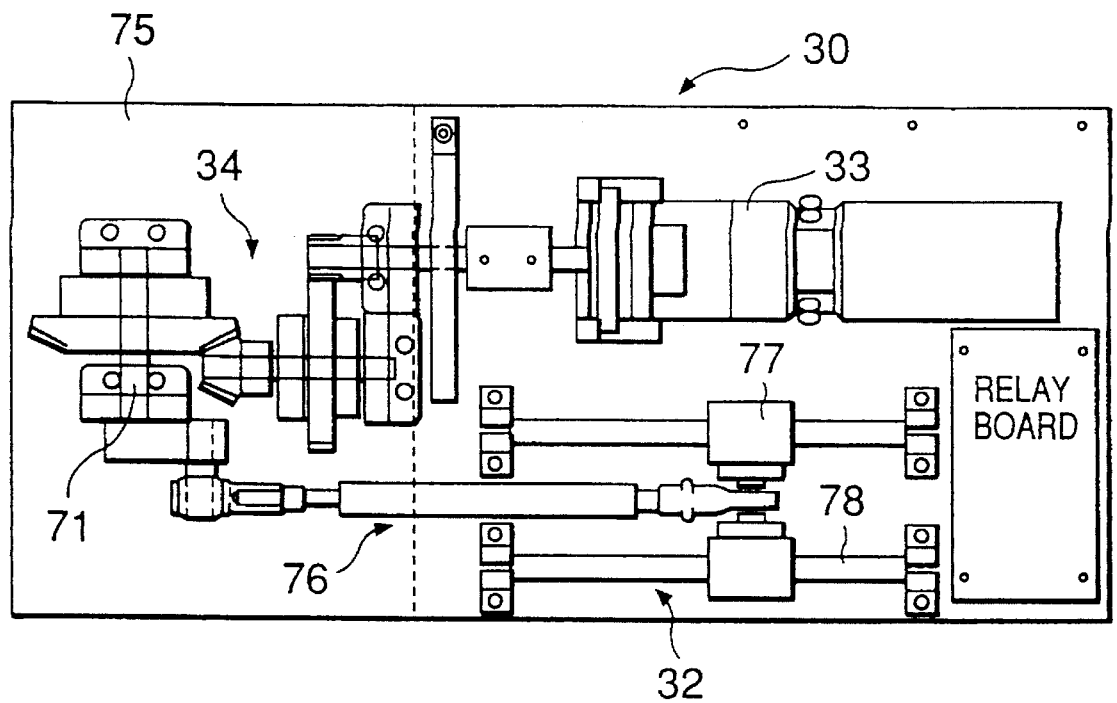
FIG. 21 is a plan view of a kinetic unit provided with a slider-crank chain mechanism.
Figure 22:
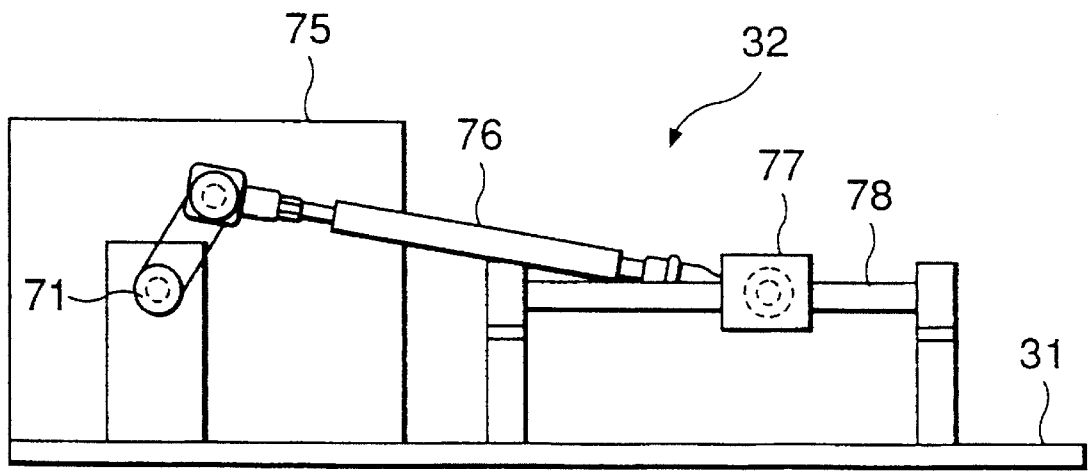
FIG. 22 is a front view of the kinetic unit of FIG. 21.

Referring to FIGS. 21 and 22, the output shaft of the DC servomotor 33 is connected to the input shaft of the reduction gear 34, and the output shaft of the reduction gear 34 is connected to a rotary shaft 71 included in the slider crank chain mechanism, i.e., the motion mechanism 32. A crank 76 is mounted at its rear end on the rotary shaft 71, and the front end of the crank 76 is pivotally connected to a slider 77 slidably mounted on a horizontal rod 78. The reduction gear 34 and the rotating part of the crank 76 are covered for safety with the transparent box 75.

3) Four-bar linkage Mechanism

Figure 23:
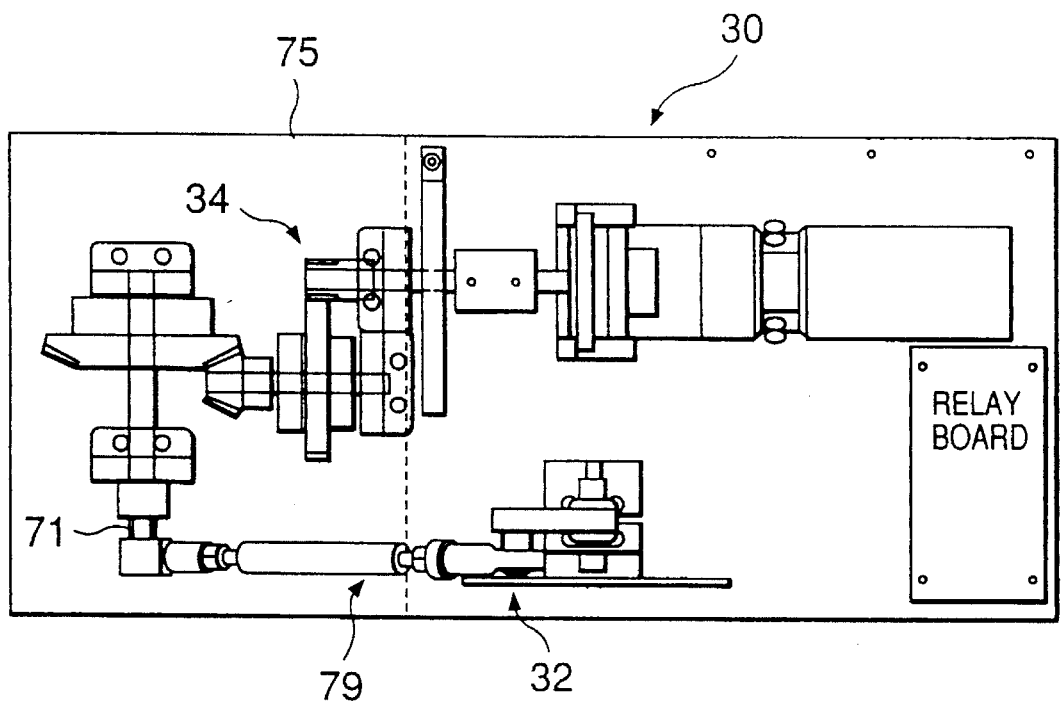
FIG. 23 is a plan view of a kinetic unit provided with a four-bar linkage mechanism.
Figure 24:
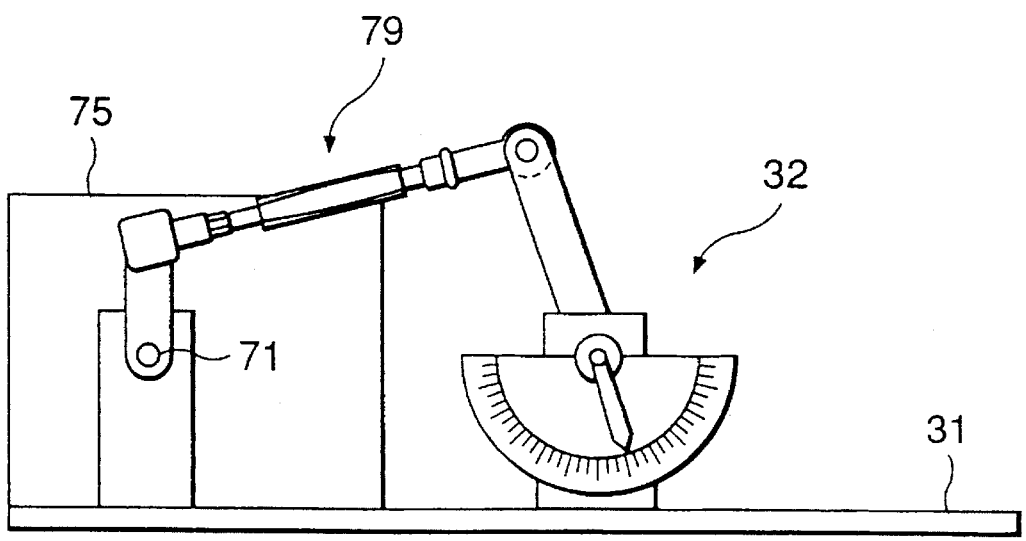
FIG. 24 is a front view of the kinetic unit of FIG. 23.

Referring to FIGS. 23 and 24, the kinetic unit 30 employing a four-bar linkage mechanism 79 as the motion mechanism 32 is similar in construction to the kinetic unit 30 employing the slider crank chain mechanism. One end of the four-bar linkage mechanism 79 is connected to a rotary shaft 71 connected to the output shaft of the reduction gear 34. The reduction gear 34 and the rotating part of the four-bar linkage mechanism 79 are covered with the transparent box 75. The lengths of the four links of the four-bar linkage mechanism 79 are determined so that one of the four links is able to make full turn.

4) Ball-Screw Mechanism

A ball-screw feed mechanism is used, for example, for feeding the tool of a machine tool and is a useful teaching material.

Figure 25:
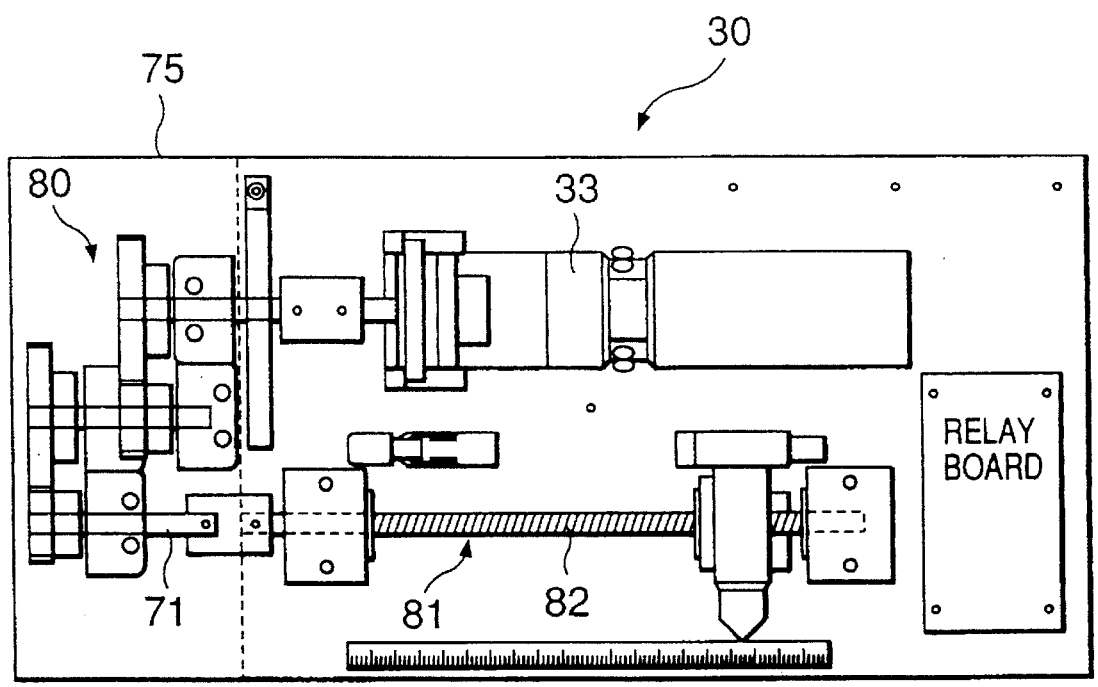
FIG. 25 is a plan view of a kinetic unit provided with a ball-screw feed mechanism.
Figure 26:
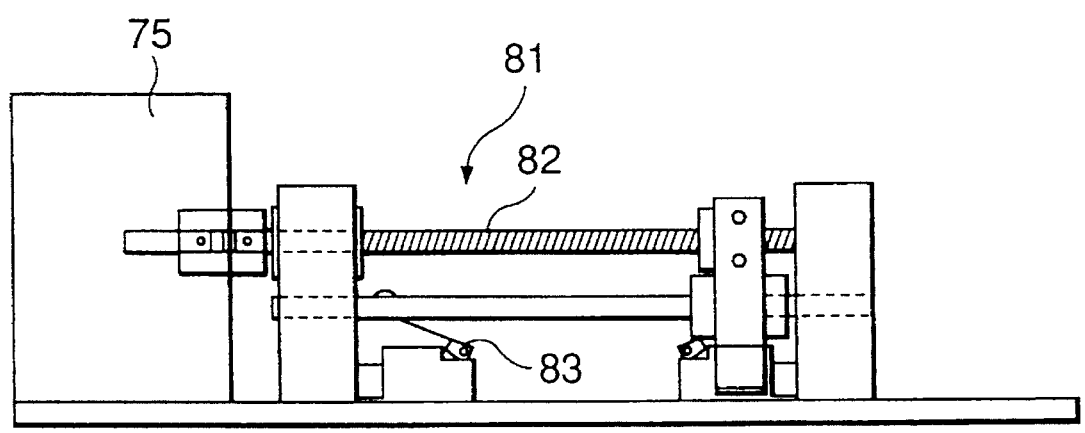
FIG. 26 is a front view of the ball-screw feed mechanism of FIG. 25.

FIGS. 25 and 26 show the kinetic unit 30 employing a ball-screw feed mechanism 81. The output shaft of the DC servomotor 33 is connected to the input shaft of a speed increasing gear 80. The output shaft of the speed increasing gear 80 serves as the rotary shaft 71 of the motion mechanism 32, i.e., the ball-screw feed mechanism 81. The ball-screw feed mechanism 81 has a screw shaft 82 connected to the rotary shaft 71.

The ball-screw feed mechanism 81 is provided with stoppers 83 limiting the range of movement of the ball of the ball-screw feed mechanism 81 to stop the operation of the kinetic unit 30 when the kinetic unit 30 becomes uncontrollable. If the ball moves beyond the limit of the range of movement, each stopper disconnects the DC servomotor 33 from the power supply.

(3) Experimental Learning

1) Study of the System

Preferably, the learner is allowed by rule to connect leads only to the jacks 1, 3 and 4. Since the previously wired connectors 7, 8 and 9 are covered with the transparent protective plates 107 and hence the learner is unable to touch the covered components. Therefore, the educational mechatronics apparatus compels the learner to obey the rule.

The learner inserts the plugs of leads into the holes 103 of the jacks 1, 3 and 4 to complete an experimental circuit as shown in FIG. 1.

In FIG. 1, "I" indicates a circuit for the study of the system, "II" indicates a circuit for the experiment of analog control, and "III" is a circuit for the experiment of digital control.

To form a circuit I for the study of the system, the D/A-input terminal 1 of the circuit board 12 is connected to the D/A-output terminal of the junction terminal/power supply unit 40 by a lead L1, and VI-output terminal 4 of the circuit board 13 is connected to the VI-input terminal 1 of the circuit board 15 by a lead L2. When forming a circuit for the study of the actions and effects of an integrator, the SK-output terminal 4 of the circuit board 17 is connected to the SK-input terminal 3 of the circuit board 13.

To form a feedback control system, the output terminal 38 (TG) of the speed sensor 35 is connected to the input terminal 1 of the circuit board 22 by a lead L4, the output terminal 4 (VF) of the circuit board 23 of the feedback control unit 20 to the input terminal 3 (VF) of the circuit board 13 by a lead L5, and the output terminal 4 (PF) of the circuit board 26 to the input terminal 3 (PF) of the circuit board 12 by a lead L6.

The input terminal and the corresponding output terminal to be interconnected by a lead are marked with the same mark, such as "VF", so that the learner may not be confused.

The power supply unit 40 is provided with two main switches 41 and 42 (FIG. 2) to enable an inexperienced learner to operate the educational mechatronics apparatus easily. When the main switch 41 is turned on, a voltage is applied only to the electric circuits (excluding the driving circuit for driving the DC servomotor) to enable the learner to examine the circuits by means of an oscilloscope, while maintaining the DC servomotor inoperative. The other main switch 42 is a motor start switch which is turned on after completing the examination of the circuits. It is believed to be safer and more effective for education to start the educational mechatronics apparatus in two steps by operating the two main switches than to start the same automatically. The educational mechatronics apparatus is provided with an emergency stop button 43. When the emergency stop button 43 is depressed while the educational mechatronics apparatus is in operation, the operation of the kinetic unit 30 is stopped. The emergency stop button 43 is relatively large to enable the learner to find and operate the emergency stop button 43 easily for emergency stop.

2) Functions of the Driving Unit i) The D/A converter supplies a very low current on the order of several tens milliamperes. Therefore, the output current of the D/A converter is amplified to a current in the range of 0 to 4 A by a transistor power amplifier and the amplified current is supplied to the DC servomotor.

ii) The subtracter subtracts feedback values from the angular displacement and the angular speed.

iii) The displacement subtracter is provided with a gain adjuster to adjust an input voltage applied to the upper voltage amplifying circuit of the power amplifier to the output voltage of the D/A converter.

iv) Current feedback control suppresses the variation of the motor driving current and improves the response of current to commands.

v) The integrator reduces steady-state deviation and suppresses the influence of disturbance, such as solid friction. When the educational mechatronics apparatus is provided with frictional components, deviations attributable to friction are accumulated and added to stop the moving parts in a mode similar to a friction-free mode.

3) Functions of the Feedback Unit i) To turn the output shaft of the DC servomotor through a specified angle, the current position is detected by the sensor, the current position is compared with a set position, the output shaft of the DC servomotor is turned further in the normal direction if the current position is before the set position or the output shaft of the DC servomotor is turned in the reverse direction if the current position is beyond the set position. The DC servomotor is stopped upon the coincidence of the position of the output shaft with the set position for displacement feedback control.

ii) The displacement feedback control circuit counts the number of pulses generated by the optical encoder by the counter, and the D/A converter converts the number of pulses into an analog voltage and applies the analog voltage to the displacement subtraction circuit of the driving unit.

iii) Feedback control includes speed feedback control to reduce vibrations attributable to overshooting. The gain adjuster functions for the optimum attenuation of vibrations.

iv) When displacement feed back is omitted and only speed feedback control is executed, the computer provides a speed command and, consequently, the DC servomotor operates continuously at a rotating speed corresponding to the speed command.

Suppose that a command requesting the DC servomotor to stop after operating for a specified time at a fixed rotating speed. Then, the DC servomotor will be stopped after operating for a certain time. However, an open-loop control is unable to determine the duration of operation of the DC servomotor accurately. When displacement feedback control is executed, the DC servomotor is driven after operating a certain time corresponding to the specified time if the DC servomotor is not stopped at a correct position, to stop the DC servomotor exactly at a specified position.

v) When the circuit III is formed for the experiment of digital control, the output terminal of the counter is connected to the I/O interface terminal of the junction board to send a sixteen bit parallel signal, and the speed feedback control circuit is connected to the A/D converter terminal of the junction board.

(4) Easiness of Study of Automatic Control

The easiness of study of automatic control can be realized in the above described embodiment.

1) The driving control circuit drives the DC servomotor according to set values given thereto through an interface from the computer to drive the motion mechanism through the reduction gear. The educational mechatronics apparatus enables the learner to understand a series of procedures and signal transfer easily through wiring work and measurement. The displacement feedback control operation, the speed feedback control operation, and the connection and disconnection of the integrator are planned by properly connecting the leads L1 to L6 provided with the banana plugs to the input and output jacks by the learner. Therefore, the learner is able to understand the configuration of the circuits. Furthermore, the educational mechatronics apparatus is easy to handle and is highly durable.

Since the electronic circuits are formed in blocks and the functions of the electronic circuits can be changed by changing the wiring, the educational mechatronics apparatus facilitates the understanding of the fundamentals of automatic control (control engineering). Further, since the educational mechatronics apparatus is capable of being set for operation in either an analog control mode or a digital control mode by properly connecting the electronic circuits, the learner is able to experience the knowledge taught by lectures practically.

Circuit boards fabricated originally by the learner can optionally be incorporated into the system by electrically connecting the circuit boards to the connectors 7, 8 and a, and terminals 1 to 6 to examine the functions and effects of the circuit boards.

2) The gains of the displacement feedback, the speed feedback and the integrator can readily be adjusted by the learner. The gains and the levels of the other components are preset and only the instructor is allowed to adjust the preset gains and levels by operating the components with a screwdriver inserted through the holes formed in the transparent protective plates. Accordingly, the learner is able to concentrate his thoughts on learning.

3) Either the analog control mode or the digital control mode can be selected simply by changing the connection of the output lead connected to the D/A converter and that of the lead for speed feedback control. Parallel multiple wire input from the counter to the DIO can be changed by the agency of software without changing the connection of the leads.

4) Experiments of ordinary analog control explainable by the theory of transfer function, such as speed control, positioning control and PID control, in which the DC servomotor is connected to a load, are feasible.

5) Experiments of advanced theories of digital control, such as experiments of the effect of sampling period and advanced control explainable by the theory of state variable function, of a grade higher than that of the theory of digital control which are taught to senior students, are feasible.

As is apparent from the foregoing description, the present invention has the following advantages.

The circuit boards arranged along the direction of signal transfer so as to correspond to the blocks appearing on a block diagram of an automatic control system on which a lecture is given, enable the learner to recognize directly and visually the internal structures of the component units of the educational mechatronics apparatus. Whereas it is impossible to touch and observe the circuit boards of the conventional educational mechatronics apparatus and to understand the circuit boards concretely, the educational mechatronics apparatus of the present invention enables the learner to recognize visually the internal structures of the blocks.

The transparent protective plates are disposed over the circuit boards so as to cover the center areas of the circuit boards excluding the opposite end portions in which the input and output terminals allowed to be operated by the learner are arranged. Therefore, the learner is inhibited from touching the components arranged in the center areas of the circuit boards. Since the learner is allowed to use only the input and output terminals related with cord connection for the blocks to be studied, the learner is able to complete a necessary cord connection by using only the least necessary number of leads without being confused.

When the components of the circuits are arranged on the front surfaces of the circuit boards and the printed wires are arranged on the back surfaces of the circuit boards, the circuit configuration can readily be understood from a circuit diagram. Since the circuit boards may be spaced apart from the base boards, the learner is able to distinguish the circuit boards visually from each other.

By forming the driving unit from a plurality of the circuit boards respectively provided with the displacement subtracter and the gain adjuster, the speed subtracter and the integrator/adder, the current detector, the current subtracter and the gain adjuster, the voltage amplifier, the integrator and the gain adjuster and the power amplifier, and by forming the feedback control unit from a plurality of the circuit boards respectively provided with the lowpass filter, the gain adjuster, the direction discriminator and the D/A converter and the level adjuster, it becomes possible to teach the learner having a vague idea of mechatronics practically so that the learner is able to understand mechatronics concretely.

In case the movable parts of the motion mechanism of the kinetic unit are covered with the transparent box, the learner can be prevented from inadvertently touching the moving parts and protected from injuries.

The output of the DC servomotor is transmitted to the motion mechanism of the kinetic through reduction gears which reduce the speed to half a rotational speed of the motor or below for enhanced safety. When the motion mechanism operates at such a comparatively low speed, a vibratory phenomenon, that occurs when it operates at a higher speed, does not occur and hence the study of vibration control is impossible. By mounting the inertial disk on the motor in order to generate vibrations, the study of feedback control for suppressing vibrations becomes possible while avoiding danger that will be entailed by high-speed operation.

Although the present invention has been described with reference to its preferred embodiments, many modifications and alterations may be made within the spirits of the invention.

What is claimed is:

1. An educational mechatronics apparatus comprising:

a plurality of circuit boards respectively corresponding to blocks appearing on a block diagram of an automatic control system, said plurality of circuit boards being arranged along the direction of signal transfer, each of said circuit boards being provided with actual circuit components including input and output terminals and having a center area and opposite end portions, each said circuit board including printed wires formed on the back surface thereof;

a base board for mounting said circuit boards thereon;

a post attached to said base board for supporting said circuit board, whereby said circuit board is separated away from said base board to visually distinguish said circuit boards from each other; and a transparent protective plate covering said center area of said circuit board to inhibit a learner to touch the circuits components other than the input and output terminals located in said end portions of said circuit board;

wherein the input and output terminals located in said center area of said circuit board being wired in advance of assembly of the apparatus, and the input and output terminals located in said end portions being adapted to be wired for learning by lead; and wherein the apparatus is divided into a driving unit, a feedback control unit and a kinetic unit, said driving unit and said feedback control unit comprising respective base boards and said circuit boards mounted on said base boards along the direction of signal transfer.

2. An educational mechatronics apparatus as claimed in claim 1, further comprising a computer and a power source.

3. An educational mechatronics apparatus as claimed in claim 1, wherein said driving unit includes a plurality of said circuit boards respectively provided with a displacement subtracter and a gain adjuster, a speed subtracter and an integrator/adder, a current detector, a current subtracter and a gain adjuster, a voltage amplifier, an integrator and a gain adjuster, and a power amplifier.

4. An educational mechatronics apparatus as claimed in claim 1, wherein said feedback control unit includes a plurality of said circuit boards respectively a lowpass filter, a gain adjuster, a direction discriminator, a counter, and a D/A converter and a level adjuster.

5. An educational mechatronics apparatus as claimed in claim 1, wherein said kinetic unit comprises a motion mechanism, a DC servomotor for driving said motion mechanism through a reduction gear or a speed increasing gear, a speed sensor, a displacement sensor, and a base board.

6. An educational mechatronics apparatus as claimed in claim 5, wherein said motion mechanism is selected from a group consisting of a belt-and-pulley mechanism, a slider crank chain mechanism, a four-bar linkage mechanism and a ball-screw feed mechanism.

7. An educational mechatronics apparatus as claimed in claim 6, wherein hazardous moving parts of said motion mechanism are covered with a transparent box.

8. An educational mechatronics apparatus as claimed in claim 5, wherein an output of said DC servomotor is transmitted to said motion mechanism through reduction gears which reduce a speed to about half a rotational speed of said DC servomotor or below, and an inertial disk is mounted on said DC servomotor to generate vibrations.

9. An educational mechatronics apparatus comprising:

a base board;

a plurality of circuit boards respectively corresponding to blocks appearing on a block diagram of an automatic control system, said plurality of circuit boards being mounted to said base board whereby each of said circuit boards is separated away from said base board to visually distinguish said circuit boards from each other and arranged along the direction of signal transfer, each of said circuit boards being provided with actual circuit components including input and output terminals and having a center area and opposite end portions, each said circuit board including printed wires electrically connecting said circuit components and;

a transparent protective plate covering said center area of said circuit board to inhibit a learner to touch the circuits components other than the input and output terminals located in said end portions of said circuit board;

wherein the input and output terminals located in said center area of said circuit board being wired in advance of assembly of the apparatus, and the input and output terminals located in said end portions being adapted to be wired for learning by lead; and wherein the apparatus is divided into a driving unit, a feedback control unit and a kinetic unit, said driving unit and said feedback control unit comprising respective base boards and said circuit boards mounted on said base boards along the direction of signal transfer.

10. An educational mechatronics apparatus as claimed in claim 9, wherein each said circuit board is removably mounted to said base board and defines a front surface and a back surface, said circuit components are disposed on said front surface, and said printed wires are disposed on said back surface.

11. An educational mechatronics apparatus as claimed in claim 10, further comprising a computer and a power source.

12. An educational mechatronics apparatus as claimed in claim 10, wherein said circuit board is supported on a post attached to said base board to visually distinguish said circuit boards from each other.

13. An educational mechatronics apparatus as claimed in claim 10, wherein said driving unit includes a plurality of said circuit boards respectively provided with a displacement subtracter and a gain adjuster, a speed subtracter and an integrator/adder, a current detector, a current subtracter and a gain adjuster, a voltage amplifier, an integrator and a gain adjuster, and a power amplifier.

14. An educational mechatronics apparatus as claimed in claim 10, wherein said feedback control unit includes a plurality of said circuit boards respectively a lowpass filter, a gain adjuster, a direction discriminator, a counter, and a D/A converter and a level adjuster.

15. An educational mechatronics apparatus as claimed in claim 10, wherein said kinetic unit comprises a motion mechanism, a DC servomotor for driving said motion mechanism through a reduction gear or a speed increasing gear, a speed sensor, a displacement sensor, and a base board.

16. An educational mechatronics apparatus as claimed in claim 15, wherein said motion mechanism is selected from a group consisting of a belt-and-pulley mechanism, a slider crank chain mechanism, a four-bar linkage mechanism and a ball-screw feed mechanism.

17. An educational mechatronics apparatus as claimed in claim 16, wherein hazardous moving parts of said motion mechanism are covered with a transparent box.

18. An educational mechatronics apparatus as claimed in claim 15, wherein an output of said DC servomotor is transmitted to said motion mechanism through reduction gears which reduce a speed to about half a rotational speed of said DC servomotor or below, and an inertial disk is mounted on said DC servomotor to generate vibrations.

* * * * *